(12) United States Patent
Frazier

(10) Patent No.: US 12,537,258 B2
(45) Date of Patent: Jan. 27, 2026

(54) PORTABLE BATTERY CONTAINERS

(71) Applicant: Andrew G. C. Frazier, Sunnyvale, CA (US)

(72) Inventor: Andrew G. C. Frazier, Sunnyvale, CA (US)

( * ) Notice: Subject to any disclaimer, the term of this patent is extended or adjusted under 35 U.S.C. 154(b) by 929 days.

(21) Appl. No.: 17/687,784

(22) Filed: Mar. 7, 2022

(65) Prior Publication Data

US 2022/0294066 A1    Sep. 15, 2022

Related U.S. Application Data

(60) Provisional application No. 63/159,376, filed on Mar. 10, 2021.

(51) Int. Cl.
*H01M 50/267* (2021.01)
*H01M 10/44* (2006.01)
(Continued)

(52) U.S. Cl.
CPC ....... *H01M 50/267* (2021.01); *H01M 10/441* (2013.01); *H01M 10/46* (2013.01);
(Continued)

(58) Field of Classification Search
CPC ........ H02J 7/342; H02J 7/0013; H02J 7/0045; H02J 7/0047; H01M 10/441; H01M 10/46;
(Continued)

(56) References Cited

U.S. PATENT DOCUMENTS

| 3,741,815 A | 6/1973 | Peterson |
| 5,123,681 A | 6/1992 | Kos |

(Continued)

FOREIGN PATENT DOCUMENTS

| EP | 1422768 A1 * | 5/2004 | ........... B05B 9/0861 |
| FR | 2806836 A1 * | 9/2001 | ........... H01M 50/202 |

(Continued)

OTHER PUBLICATIONS

Machine Translation of JP-H1186814-A (Feb. 18, 2025) (Year: 2025).*

(Continued)

*Primary Examiner* — Matthew J Merkling
(74) *Attorney, Agent, or Firm* — Franklin & Associates International Inc; Matthew F. Lambrinos

(57) ABSTRACT

Apparatus for protecting batteries from impact, dust, dirt, moisture, smoke, and flame comprised of a container that accepts modular battery inserts that releasably retain batteries. Apparatus for protecting batteries capable of capturing batteries between insertable structures and the protective container walls. The apparatus can include insertable structures that can be inserted into the container in multiple orientations to provide or restrict access to batteries retained in said insertable structures. The apparatus can include electronics within the container, configured to charge batteries stored in the container either by utilizing an onboard power source such as an additional battery or an external power source such as household alternating current power, or both.

20 Claims, 13 Drawing Sheets

(51) Int. Cl.
    *H01M 10/46*     (2006.01)
    *H01M 50/262*     (2021.01)
    *H01M 50/289*     (2021.01)
    *H02J 7/00*     (2006.01)
    *H02J 7/34*     (2006.01)

(52) U.S. Cl.
    CPC ....... *H01M 50/262* (2021.01); *H01M 50/289* (2021.01); *H02J 7/0013* (2013.01); *H02J 7/0045* (2013.01); *H02J 7/0047* (2013.01); *H02J 7/342* (2020.01)

(58) Field of Classification Search
    CPC . H01M 50/267; H01M 50/262; H01M 50/289
    See application file for complete search history.

(56) References Cited

U.S. PATENT DOCUMENTS

| | | | |
|---|---|---|---|
| 5,612,147 A * | 3/1997 | Nagata | H01M 50/213 |
| | | | 429/100 |
| 6,015,064 A | 1/2000 | Liu | |
| 6,184,280 B1 | 2/2001 | Shibuta | |
| 6,196,405 B1 | 3/2001 | Kambouris | |
| 6,507,170 B2 * | 1/2003 | O'Neill | H01M 50/559 |
| | | | 320/107 |
| 6,811,099 B2 * | 11/2004 | Krestine | B05B 9/0861 |
| | | | 239/524 |
| 6,942,359 B2 * | 9/2005 | Furth | F21L 4/005 |
| | | | 362/205 |
| 6,953,126 B2 | 10/2005 | Parker et al. | |
| 7,287,648 B2 * | 10/2007 | Foreman | H01M 50/227 |
| | | | 206/703 |
| 7,663,879 B2 | 2/2010 | Richardson et al. | |
| 7,780,048 B2 | 8/2010 | Howell | |
| 8,361,608 B1 | 1/2013 | Hansen et al. | |
| 8,523,029 B2 | 9/2013 | Rogers et al. | |
| 8,952,780 B2 | 2/2015 | Simpson | |
| 10,143,294 B1 | 12/2018 | Matson et al. | |
| 10,217,977 B2 | 2/2019 | Bhardwaj et al. | |
| 10,862,320 B2 | 12/2020 | Carkner et al. | |
| 10,999,958 B2 | 5/2021 | Frazier | |
| 2004/0099751 A1 * | 5/2004 | Krestine | B05B 9/0861 |
| | | | 239/302 |
| 2004/0107745 A1 | 6/2004 | Williamson | |
| 2005/0031940 A1 * | 2/2005 | Chacon | H01M 50/202 |
| | | | 429/100 |
| 2005/0122715 A1 * | 6/2005 | Furth | H01M 50/267 |
| | | | 362/208 |
| 2007/0125137 A1 | 6/2007 | Galant | |
| 2009/0261695 A1 | 10/2009 | Yeh | |
| 2009/0321303 A1 | 12/2009 | Kang | |
| 2010/0237829 A1 * | 9/2010 | Tatebayashi | H01M 10/441 |
| | | | 320/118 |
| 2011/0036747 A1 | 2/2011 | Petrick | |
| 2012/0037385 A1 * | 2/2012 | Suzuki | B25F 5/02 |
| | | | 173/2 |
| 2012/0175391 A1 | 7/2012 | Rogers et al. | |
| 2013/0258573 A1 | 10/2013 | Muday et al. | |
| 2014/0209502 A1 | 7/2014 | Kadda | |
| 2017/0150623 A1 | 5/2017 | May | |
| 2019/0394910 A1 | 12/2019 | Frazier | |
| 2020/0176731 A1 * | 6/2020 | Taga | H01M 10/44 |
| 2022/0271385 A1 * | 8/2022 | Yoder | H01M 50/213 |
| 2022/0294061 A1 * | 9/2022 | Hsiao | H01M 50/202 |
| 2024/0213611 A1 * | 6/2024 | Patil | H01M 50/204 |

FOREIGN PATENT DOCUMENTS

| | | | | |
|---|---|---|---|---|
| GB | 2360396 A | * | 9/2001 | ......... H01M 50/202 |
| JP | H1186814 A | * | 3/1999 | |

OTHER PUBLICATIONS

Machine Translation of FR-2806836-A1 (Jul. 8, 2025) (Year: 2025).*
Andrew G.C. Frazier, Containers, U.S. Design U.S. Appl. No. 29/806,894, filed Sep. 7, 2021.

* cited by examiner

SECTION A-A

PORTABLE BATTERY CONTAINERS

CROSS-REFERENCE TO RELATED APPLICATION

This application claims the benefit of priority under 35 U.S.C. § 119(e) based upon U.S. provisional patent application Ser. No. 63/159,376 filed on Mar. 10, 2021. The entire disclosure of the prior provisional application is incorporated herein by reference.

BACKGROUND

Technical Field

This application relates generally to the field of portable battery storage devices, in particular, portable battery containers that include an internal modular battery organization system. This application further covers portable battery containers that can recharge batteries.

Background Description

Military, law enforcement and other related personnel are increasingly required to utilize electronics and other battery-powered equipment in the execution of their duties.

Personnel may be required to carry illumination, communication, and navigation equipment such as radios, global positioning systems (GPS), flashlights, headlamps, and many other, similar mission-specific gear. This gear may require multiple types and sizes of batteries, and users may require multiples of the same battery to power their equipment over the course of their duties as batteries are depleted. Furthermore, users often require different equipment as their missions and duties change, thus requiring a different combination of batteries at different times.

SUMMARY

In view of the foregoing disadvantages inherent in the known types of portable battery containers, the present technology provides a novel portable battery container with modular inserts and overcomes one or more of the mentioned disadvantages and drawbacks of these known devices. As such, the general purpose of the present technology, which will be described subsequently in greater detail, is to provide new and novel portable battery containers which have all the advantages of the prior art mentioned heretofore and many novel features that result in portable battery containers which is not anticipated, rendered obvious, suggested, or even implied by the prior art, either alone or in any combination thereof.

While the known types of portable battery containers fulfill their respective, particular objectives and requirements, the aforementioned devices or systems do not describe portable battery containers that include modular inserts for battery configuration alone, or in combination with providing integrated battery charging capability.

A need exists for a new and novel portable battery containers that provide a sealable cavity in combination with providing modular battery organizing structures and battery charging capability. In this regard, the present technology substantially fulfills this need. In this respect, the portable battery containers according to the present technology substantially departs from the conventional concepts and designs of the prior art, and in doing so provides an apparatus primarily developed for the purpose of protecting and organizing various configurations of batteries in combination with providing the ability to charge said batteries while stored in the portable battery container.

According to one aspect of the present technology, the present technology essentially includes a container system including a first and second hollow structure. The hollow structures are pivotably associated with each other to permit relative rotation and opening and closing of the hollow structures. The hollow structures can be apposed to each other and configured to create a sealed cavity when closed. A multitude of insertable structures that have flexible protrusions capable of encapsulating or partially encapsulating and retaining at least one battery and having separate, releasable interlocking features that allow the insertable structures to be attached to the internal surfaces of the hollow structures. In one aspect of the present technology, the releasable interlocking features may include protrusions that interface with corresponding cavities present on the internal surfaces of the hollow structures. The insertable structures can be inserted into various areas within the case, securing them in place with the releasable interlocking features, allowing users to use separate, and different-sized insertable structures to carry both different sized batteries and different multiples of the same batteries within the hollow structures' cavities.

According to another aspect of the present technology, a device comprising two hollow structures that are apposed to create a sealed cavity. A hinge can be located along a first side of the two hollow structures to permit relative rotation and opening and closing of the sealed cavity. A latch on a second side opposite the first side. The latch can be fixed to one side and releasably engaged in the second hollow structure by way of a locking member.

According to yet another aspect of the present technology, the present technology essentially includes a container system including a first and second hollow structure. The hollow structures are pivotably associated with each other to permit relative rotation and opening and closing of the hollow structures. The hollow structures can be apposed to each other and configured to create a sealed cavity when closed. A multitude of insertable structures that have flexible protrusions capable of encapsulating or partially encapsulating and retaining at least one battery and having separate, releasable interlocking features that allow the insertable structures to be attached to the internal surfaces of the hollow structures. In one aspect of the present technology, the insertable structures can be attached to the internal surfaces of the hollow structures in at least two configurations including a first configuration whereas the battery is accessible to the user while attached to the hollow structure and a second configuration that prevents the user from accessing the battery while the insertable structure is attached to the case. These two configurations allow the user to designate, by way of selecting the configuration used, a difference in battery status. For example, the user may choose to use the first configuration, in which the battery is accessible whilst in the hollow structures for fully charged batteries while using the second configuration to designate the batteries that have been depleted. In one aspect of the present technology, the first configuration would be configured by inserting and attaching the insertable structure in the hollow cavity with the releasable battery features facing away from the hollow structure, allowing battery access, and the second configuration would be configured by inserting and attaching the insertable structure in the hollow cavity with the releasable battery features facing towards the hollow structure thus preventing access to a battery attached to the insertable structure.

According to still yet another aspect of the present technology, a device comprising two hollow structures that are apposed to create a sealed cavity. A hinge can be located along a first side of the two hollow structures to permit relative rotation and opening and closing of the sealed cavity. A latch on a second side opposite the first side. The latch can be fixed to one side and releasably engaged in the second hollow structure by way of a locking member. A multitude of insertable structures configured to reliably retain at least on battery, attached to the hollow structures. Additionally present on the insertable structures are conductive circuits comprised of wires, ribbons, or other structures known to those skilled in the art that contact or otherwise interface with the batteries retained in the hollow structures. The conductors further interface with additional conductors present in or on the hollow cavities. The conductors on the hollow cavities are connected to additional electronic components in the hollow cavity including but not limited to integrated circuits, resistors, capacitors, light emitting diodes, and batteries configured to allow determination of the batteries' charge status, the battery type, and to allow re-charging of the battery as necessary.

In another aspect, the present technology can include a container system that can include a first hollow structure, a second hollow structure and at least one insertable structure. The first hollow structure and the second hollow structure can be pivotably associated with each other to permit relative rotation and opening and closing of the first hollow structure and the second hollow structure. The first hollow structure and the second hollow structure can be apposed to each other and configured to create a sealed cavity when in a closed position. The insertable structure can be configured to accept a battery and can be able to be releasably attached to at least one of the first hollow structure and the second hollow structure.

In still another aspect, the present technology can include a container system that can include a first hollow structure, a second hollow structure and at least one insertable structure. The first hollow structure and the second hollow structure can be pivotably associated with each other to permit relative rotation and opening and closing of the first hollow structure and the second hollow structure. The first hollow structure and the second hollow structure can be apposed to each other and configured to create a sealed cavity when in a closed position. The insertable structure can be configured to accept one or more batteries and can be able to be releasably attached to at least one of the first hollow structure and the second hollow structure. At least one of the first hollow structure and the second hollow structure can house an electronic charge controller module in releasable electrical contact with at least one of the batteries through conductive pathways in the first hollow structure, the second hollow structure and the insertable structure.

In still yet another aspect, the present technology can include a device that can include a first hollow structure, as second hollow structure and at least one insertable structure. The first hollow structure and the second hollow structure can be pivotably associated with each other to permit relative rotation and opening and closing of the first hollow structure and the second hollow structure. The first hollow structure and the second hollow structure can be apposed to each other and can be configured to create a sealed cavity when in a closed position. The insertable structure can be configured to accept a battery and able to be releasably attached to at least one of the first hollow structure and the second hollow structure.

In some embodiments of the present technology, insertable structures capable of releasably retaining batteries include imbedded electronic components including but not limited to resistors, capacitors, and integrated circuits. Said electronic components can interface with electronics included in the hollow cavities by way of conductive connections at the junctions between the hollow cavities and the insertable structures. The insertable structures' electronics can thus communicate with the hollow cavities' electronics and provide information about the type of insertable structure that is present in the hollow cavities. In some embodiments of the present technology, the insertable structure can communicate the battery type it can retain to the electronics on the hollow cavity in order to configure recharging parameters such as current and voltage supplied to the battery from the hollow cavity electronics by way of the insertable structures' conductive pathways and electronics.

In some embodiments of the present technology, the insertable structures may include light emitting diodes connected to additional electronics either within the insertable structure or connected to the electronics on the hollow cavities. The light emitting diodes can be activated, by way of the hollow structures' electronics to emit different colored light depending on the charge status of the battery attached to the insertable structure. Alternately, the light emitting diodes can be configured, by way of the electronics to emit different, intermittent lighting patterns such as fast or slow blinking, depending on the charge status of the battery attached to the insertable structure.

In some embodiments of the present technology, the electronics within the hollow structures that communicate and deliver electrical current to the batteries within the insertable structures attached to the hollow cavities may include an additional battery. This configuration would allow users to recharge the batteries within the insertable structures using the energy stored in the additional battery. Furthermore, the additional battery could be charged by external sources such as domestic alternating current power, through conductors and electronics inside, or attached to, the hollow structures.

In some embodiments of the present technology, electronics within the hollow structures that communicate and deliver electrical current to the batteries within the insertable structures attached to the hollow cavities may be powered by sources external to the hollow structures. A power cord, able to be connected to household or other stationary power sources, can be releasably attached to a receptacle on the outside of the hollow structures. The receptacle is connected by way of conductive pathways such as metallic wires or ribbon to electronics within the hollow structures. The power provided by the household or stationary power sources can be utilized by the electronics on the hollow structures to provide recharging power to batteries retained in the insertable structures.

In some embodiments of the present technology, insertable structures, having a proximal and distal surface, the proximal surface including at least one rigid protrusion that can engage at least one corresponding recess in the hollow cavities, and the distal surface including similar rigid protrusion or protrusions attached to the distal surface by way of a cantilevered lever that includes both the rigid protrusions and a user-actuating surface to release the rigid protrusions from corresponding recesses in the hollow cavities. Additionally, flexible cantilevered protrusions extend from multiple locations along the length of the insertable structure that are sized and shaped to releasably accept and retain specific battery types within the insertable structure.

In some embodiments of the present technology, a recessed cavity in at least one of the hollow structures sized to accept a coin-style or similar battery. Furthermore, an insertable structure may be releasably attached to the hollow cavity in a specific location and orientation as to capture the coin-style battery between the hollow structure and the insertable structure.

In some embodiments of the present technology, a latch mechanism assembly on a second hollow structure opposite the first hollow structure. The latch mechanism can be fixed to one side and releasably engaged in the second hollow structure by way of a locking member. The latch mechanism including a latching handle attached to a second latching structure by way of a pivoting hinge. The second latching structure additionally attached to a first hollow structure by a pivoting hinge. The second latching structure having a locking member. The hinges attaching the latching handle, second latching structure, and first hollow structure are configured such that the locking member can engage a protrusion on the first hollow structure and further lock into place by pivoting the latching handle over-center to provide releasable tension on the locking member and thus closing the first and second hollow structures together.

In some or all embodiments, the insertable structure can include a distal end and a proximal end. The distal end can have at least one distal end locking protrusion configured to engage a first recessed cavity of the second hollow structure. The proximal end can have a cantilevered member with a least one proximal end locking protrusion configured to engage a second recessed cavity of the second hollow structure.

In some or all embodiments, the insertable structure can include a distal end and a proximal end, and at least one flexible protrusion perpendicular to an axis of the insertable structure forming a concavity that can accept and retain the battery or batteries.

Some or all embodiments of the present technology can include a hinge located along a first side of the first hollow structure and the second hollow structure to permit the relative rotation and opening and closing of the first hollow structure and the second hollow structure.

Some or all embodiments of the present technology can include a latch on a second side of the first hollow structure opposite the first side. The latch can be releasably engageable with a locking member of the second hollow structure.

In some or all embodiments, the insertable structure can be configured to be releasably attached to at least one of the first hollow structure and the second hollow structure in an orientation that provides access to the accepted battery within the insertable structure In some or all embodiments, the insertable structure can be configured to be alternately oriented to prevent access to the battery within the insertable structure.

In some or all embodiments, at least one recessed cavity within the second hollow structure can be configured to accept the battery or batteries.

In some or all embodiments, the insertable structure that can be releasably attached to the second hollow structure further constraining the battery or batteries while the insertable structure attached to the second hollow structure.

Some or all embodiments of the present technology can include a housed in at least one of the first hollow structure and the second hollow structure. The electronic charge controller module can be in releasable electrical contact with at least one of the batteries through conductive pathways in the first hollow structure, the second hollow structure and the insertable structure.

In some or all embodiments, the electronic charge controller can be configured or configurable to sense a charge status of the at least one of the batteries and recharge the at least one of the batteries from an external energy source connected to the electronic charge controller.

In some or all embodiment, the external energy source can be a battery source housed in the least one of the first hollow structure and the second hollow structure.

There are, of course, additional features of the present technology that will be described hereinafter and which will form the subject matter of the claims attached.

There has thus been outlined, rather broadly, features of the present technology in order that the detailed description thereof that follows may be better understood and in order that the present contribution to the art may be better appreciated.

Numerous objects, features and advantages of the present technology will be readily apparent to those of ordinary skill in the art upon a reading of the following detailed description of the present technology, but nonetheless illustrative, embodiments of the present technology when taken in conjunction with the accompanying drawings.

As such, those skilled in the art will appreciate that the conception, upon which this disclosure is based, may readily be utilized as a basis for the designing of other structures, methods and systems for carrying out the several purposes of the present technology. It is, therefore, that the claims be regarded as including such equivalent constructions insofar as they do not depart from the spirit and scope of the present technology.

These together with other objects of the present technology, along with the various features of novelty that characterize the present technology, are pointed out with particularity in the claims annexed to and forming a part of this disclosure. For a better understanding of the present technology, its operating advantages and the specific objects attained by its uses, reference should be made to the accompanying drawings and descriptive matter in which there are illustrated embodiments of the present technology. Whilst multiple objects of the present technology have been identified herein, it will be understood that the claimed present technology is not limited to meeting most or all of the objects identified and that some embodiments of the present technology may meet only one such object or none at all.

BRIEF DESCRIPTION OF THE DRAWINGS

Certain preferred embodiments and modifications thereof will become apparent to those skilled in the art from the detailed description below having reference to the figures that follow. The present technology will be better understood and objects other than those set forth above will become apparent when consideration is given to the following detailed description thereof. Such description makes reference to the annexed drawings wherein.

The same reference numerals refer to the same parts throughout the various figures.

DETAILED DESCRIPTION OF THE PREFERRED EMBODIMENTS

Figure 1:
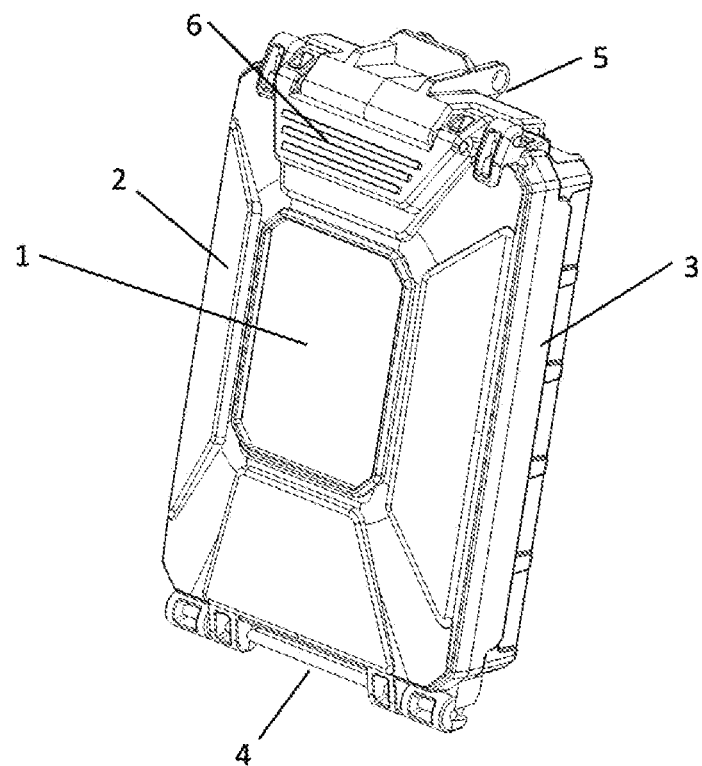
FIG. 1 is a perspective illustration of a portable battery container in accordance with one or more embodiments in a closed configuration.

In the following description, for purposes of explanation and not limitation, specific details are set forth, such as particular embodiments, procedures, techniques, etc. in order to provide a thorough understanding of the present technology. However, it will be apparent to one skilled in the art that the present technology may be practiced in other embodiments that depart from these specific details.

The following disclosure provides embodiments of systems and methods for portable battery containers capable of accepting insertable battery-retaining structures and further providing protection from environmental hazards such as impact, moisture, dirt, dust, oils, smoke, and flame. The following disclosure further provides embodiments of portable battery containers capable of recharging batteries within the container utilizing additional batteries, external energy sources such as household A/C power, or both. The application of said containers includes, but is not limited to, portable protection, organization, and charging of batteries.

It has been determined that as batteries are depleted and replaced in equipment, many users need to retain the discharged batteries for future use. In many cases, this presents the potential for confusing depleted batteries with fully-charged batteries. Therefore, users would benefit from features that allows users to designate the status of batteries, or from device features that automatically assess the battery's charge status and indicate it to the user.

Furthermore, as batteries are depleted, there exists a need to have said batteries recharged in the field, within the portable battery container, prior to the end of the mission in order to keep necessary electronic equipment operational. There is also a need for batteries to be recharged after a mission has been completed and users have returned from the field, while still inside the portable battery container utilizing stationary energy sources such as utility power or household power.

Due to the environmental hazards associated with many military, law enforcement, or similar duties, there exists a need for portable battery containers to resist the infiltration of moisture, gas, and particulate matter such as water, chemical agents, dirt, and dust. Batteries may also need to be physically isolated from shock, impact, and vibration resulting from the user's environment in order to prevent damage to the batteries and even harm to the user through excessive discharge or exposure to the battery's contents.

Current portable battery containers generally comprised of sewn textile pockets or polymer containers but they do not allow users to adjust their battery configurations and types, nor indicate batteries' charge status. Furthermore, current portable battery containers to not allow for charging while away from stationary power sources or allow for batteries to remain in the container while being charged via stationary power sources.

Thus, there remains an unmet need in the art for a portable battery container capable of protecting batteries while further allowing the user to reconfigure the type and quantity of batteries within the case and protect the batteries from environmental harm. Additionally, there exists an unmet need for a portable battery container than can indicate, or allow the user to indicate, the charge status of batteries enclosed within the container. Lastly, there exists an unmet need for a portable battery container capable of charging batteries within, either when the user is away from stationary power sources, or while stationary power sources are available.

FIG. 1 shows a perspective illustration of an embodiment of a protective battery container 1 comprised principally of a front hollow structure 2 and a back hollow structure 3 whose concavities are apposed to create a protective space. Furthermore, FIG. 1 shows a latch 5 attached to the front hollow structure 2 and engaged on a corresponding lip on the back hollow structure 3. Alternately, the latch 5 could be permanently mounted on the back hollow structure 3 and designed to engage a locking feature on the front hollow structure 2. The front and back hollow structures 2, 3 are connected by hinge features 4 compromised of protrusions extending from said structures with concentric holes aligned by a cylindrical pin allowing the back and front hollow structures to rotate relative to each other.

Figure 2:
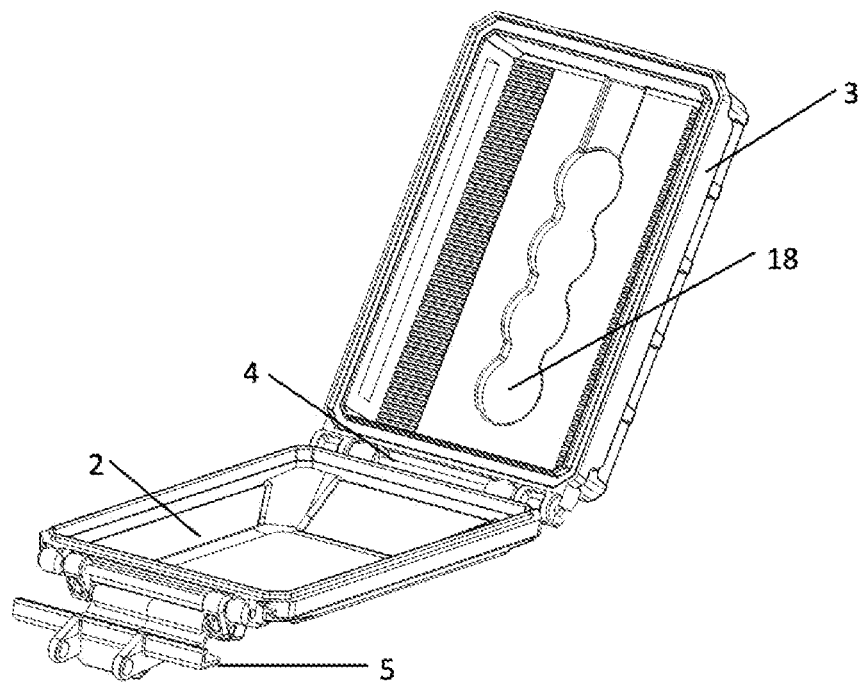
FIG. 2 is a perspective illustration of a portable battery container in accordance with one or more embodiments in an open configuration.

FIG. 2 shows an alternate perspective illustration of an embodiment of a protective battery container 1 wherein the front hollow structure 2 and a back hollow structure 3 are rotated apart, opening the container.

Figure 3:
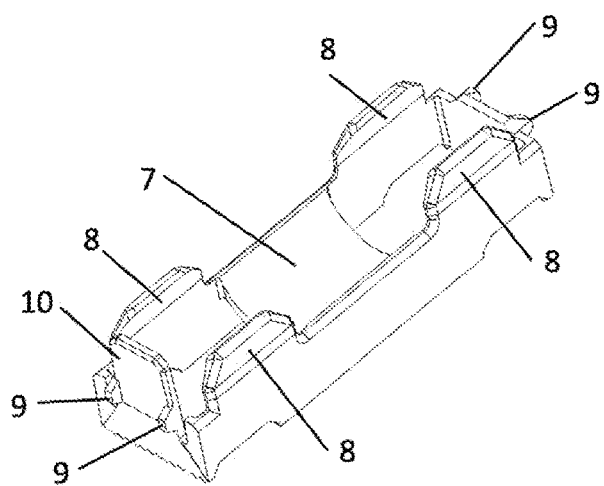
FIG. 3 is a perspective illustration of an insertable structure in accordance with one or more of the embodiments.

FIG. 3 shows a perspective illustration of an insertable structure 7 having of a proximal and distal end, the proximal end including protrusions 9 extending from the insertable structure. Furthermore, the insertable structure 7 includes protrusions 9 extending from a cantilevered lever 10 on the distal end of the insertable structure. The cantilevered lever 10 can be deflected such that the distance between the distal and proximal protrusions 9 can be temporarily shorted or lengthened to allow inserting the insertable structure into the front hollow structure 2 or back hollow structure 3 shown in FIGS. 1 and 2. Further the insertable structure has flexible protrusions 8 configured along the length between the proximal and distal ends with curvatures such that they form a concavity capable of releasably accepting a battery or batteries.

Figure 4:
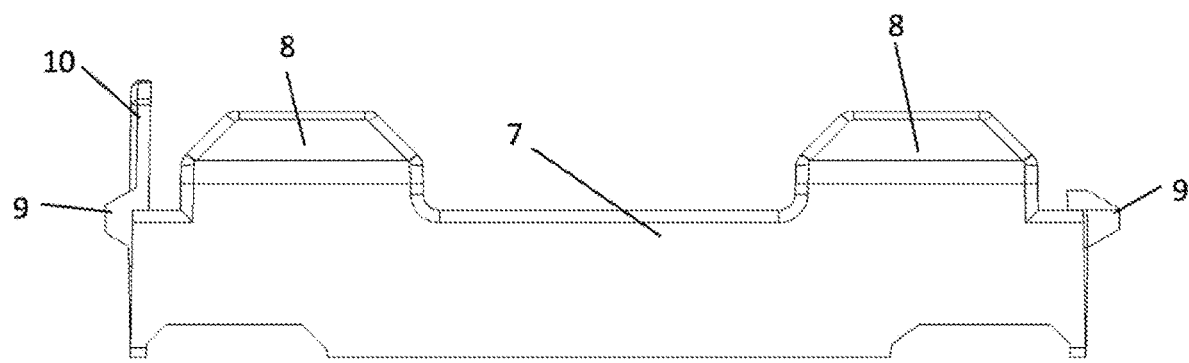
FIG. 4 is a side-view illustration of an insertable structure in accordance with one or more of the embodiments.

FIG. 4 further shows a side illustration of an insertable structure 7 as described above.

Figure 5:
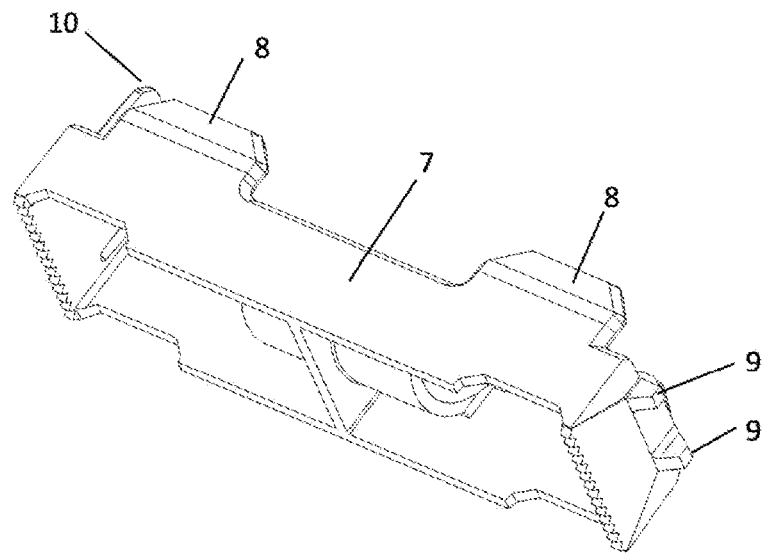
FIG. 5 is an alternate perspective illustration of an insertable structure in accordance with one or more of the embodiments.

Additionally, FIG. 5 shows an alternate perspective illustration of an insertable structure 7 as described above.

Figure 6:
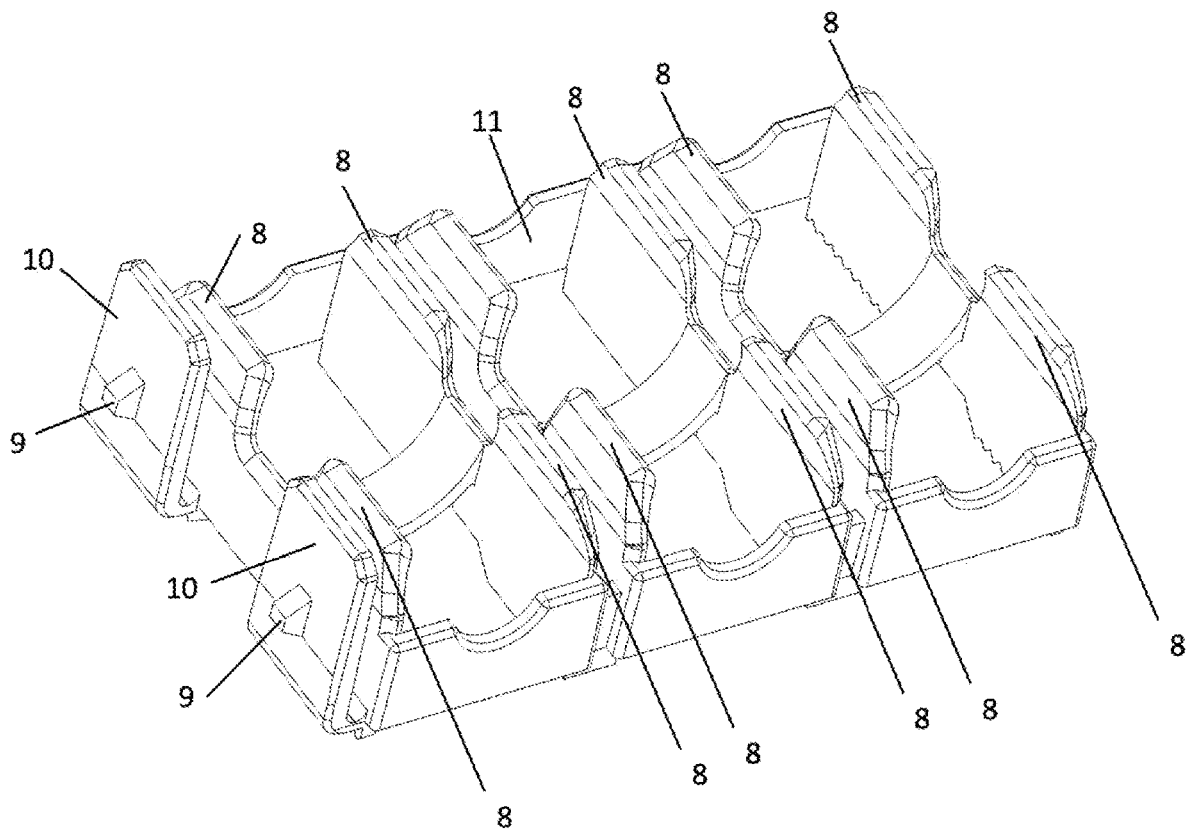
FIG. 6 is a perspective illustration of an insertable structure in accordance with one or more of the embodiments with multiple flexible protrusions.

FIG. 6 shows a perspective illustration of an alternate embodiment of an insertable structure 11 capable of releasably accepting multiple batteries and able to be releasably inserted into a hollow structure of the portable battery container. The alternate embodiment of an insertable structure 11 is comprised of a proximal and distal end, the proximal end having protrusions 9 extending from the insertable structure. Furthermore, the insertable structure 7 includes protrusions 9 extending from a cantilevered levers 10 on the distal end of the insertable structure. The cantilevered levers 10 can be deflected such that the distance between the distal and proximal protrusions 9 can be temporarily shorted or lengthened to allow inserting the insertable structure into the front hollow structure 2 or back hollow structure 3. Further the insertable structure has flexible protrusions 8 configured perpendicular to the proximal and distal axis and configured in grouped shapes such that they form multiple concavities capable of releasably accepting a battery or batteries.

Figure 7:
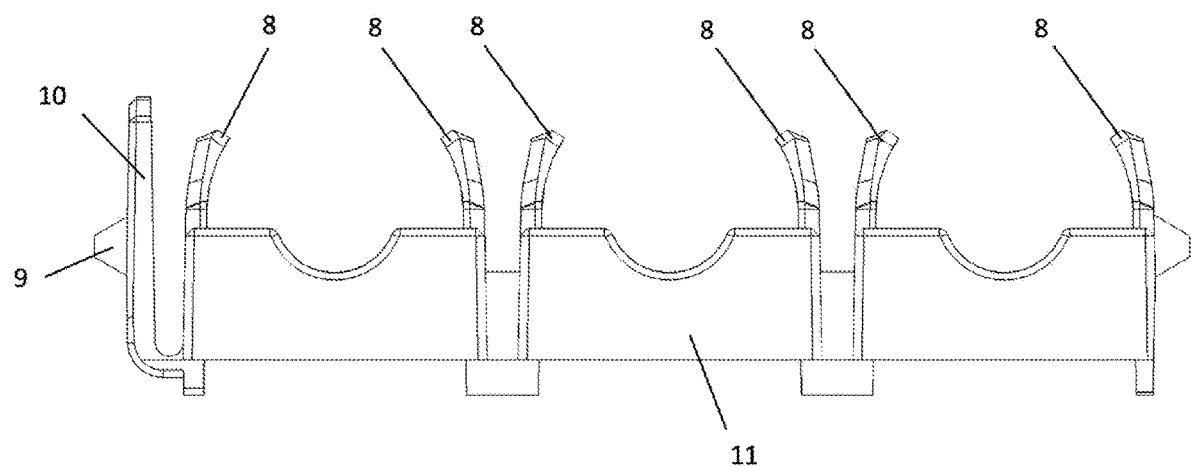
FIG. 7 is a side-view illustration of an insertable structure in accordance with one or more of the embodiments with multiple flexible protrusions.

FIG. 7 shows a side illustration of an alternate embodiment of an insertable structure 11 as described above.

Figure 8:
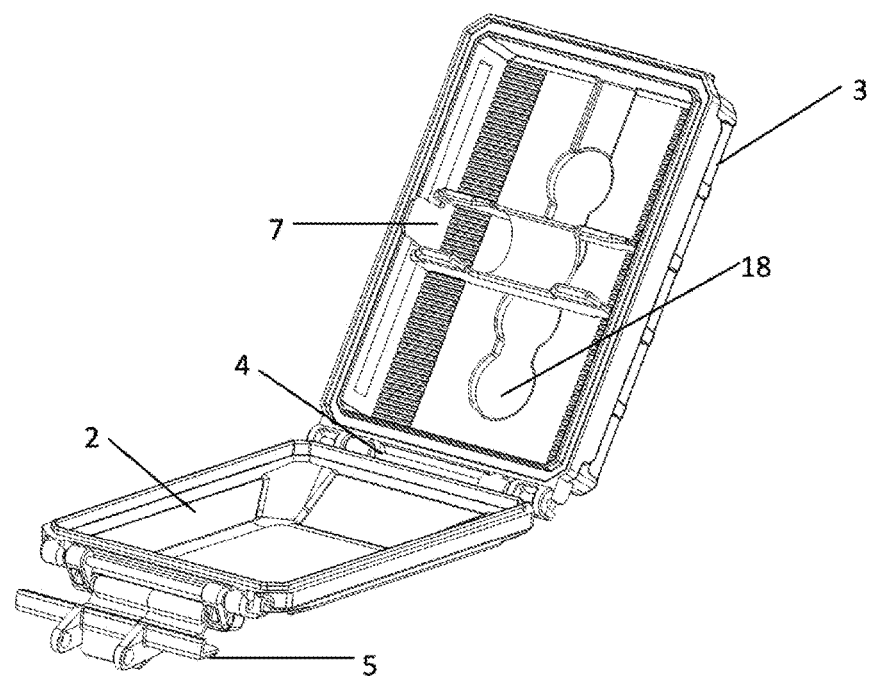
FIG. 8 is a perspective illustration of a portable battery container in accordance with one or more embodiments in an open configuration with an insertable structure attached internally.

FIG. 8 shows a perspective illustration of an embodiment of a protective battery container 1 wherein the front hollow structure 2 and a back hollow structure 3 are rotated apart, opening the container. Further, an insertable structure 7 is engaged in the back hollow structure 3. This insertable structure 7 can be inserted at multiple locations within the back hollow structure 3 where its features, described above, allow it to be retained within the hollow structure.

Figure 9:
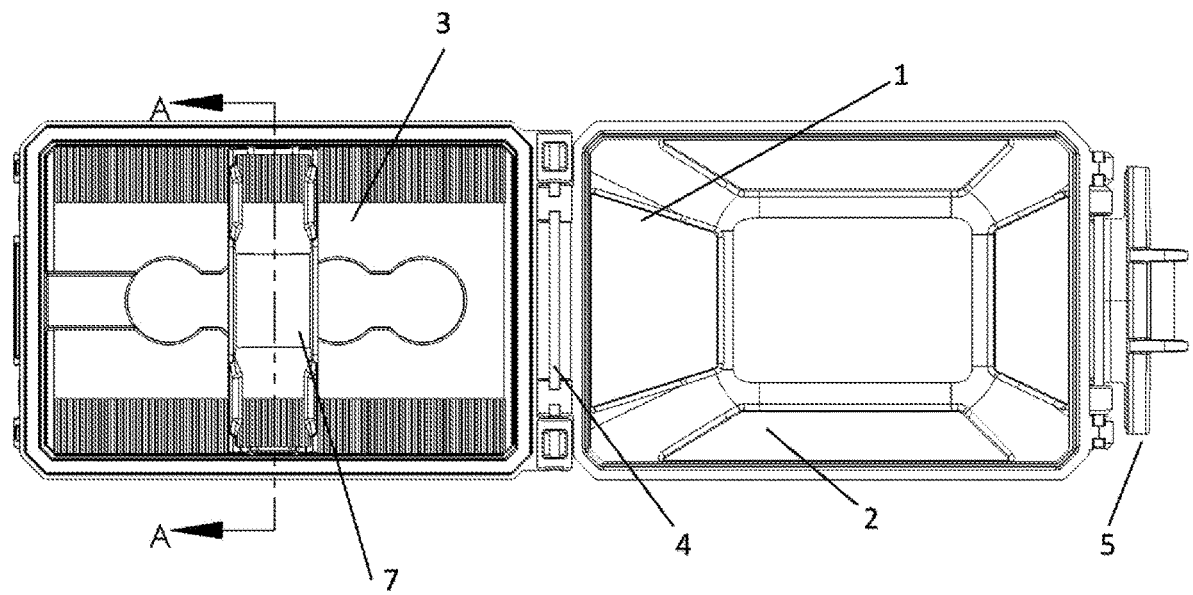
FIG. 9 is a top-view illustration of a portable battery container in accordance with one or more embodiments in an open configuration with an insertable structure attached internally. A section line is present corresponding to FIG. 10 below.

FIG. 9. shows a top view illustration of an embodiment of a protective battery container 1 wherein the front hollow structure 2 and a back hollow structure 3 are rotated apart, opening the container. Further, an insertable structure 7 is engaged in the back hollow structure 3 A section line "A-A" is drawn through the insertable structure 7 and the protective battery container 1.

Figure 10:
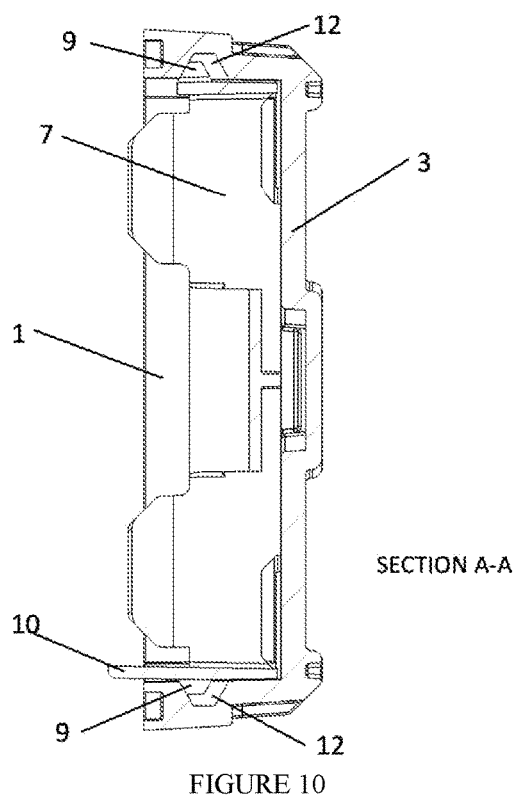
FIG. 10 is a cross-sectional illustration of portable battery container in accordance with one or more embodiments with an insertable structure attached internally.

FIG. 10. Shows a section view "A-A" illustration, referencing FIG. 9, of back hollow structure 3 and an insertable structure 7. Further shown are protrusions 9 on the distal and proximal end of the insertable structure 7, the distal protrusions mounted to the insertable structure by way of a cantilevered member 10. Additionally, the protrusions 9 are releasably engaged in the corresponding concavities 12 in the back hollow structure 3. By actuating the cantilevered member 10 towards the proximal end of the insertable structure 7, the distance between the protrusions 9 can be shortened allowing the insertable structure 7 to be removed from the back hollow structure 3.

Figure 11:
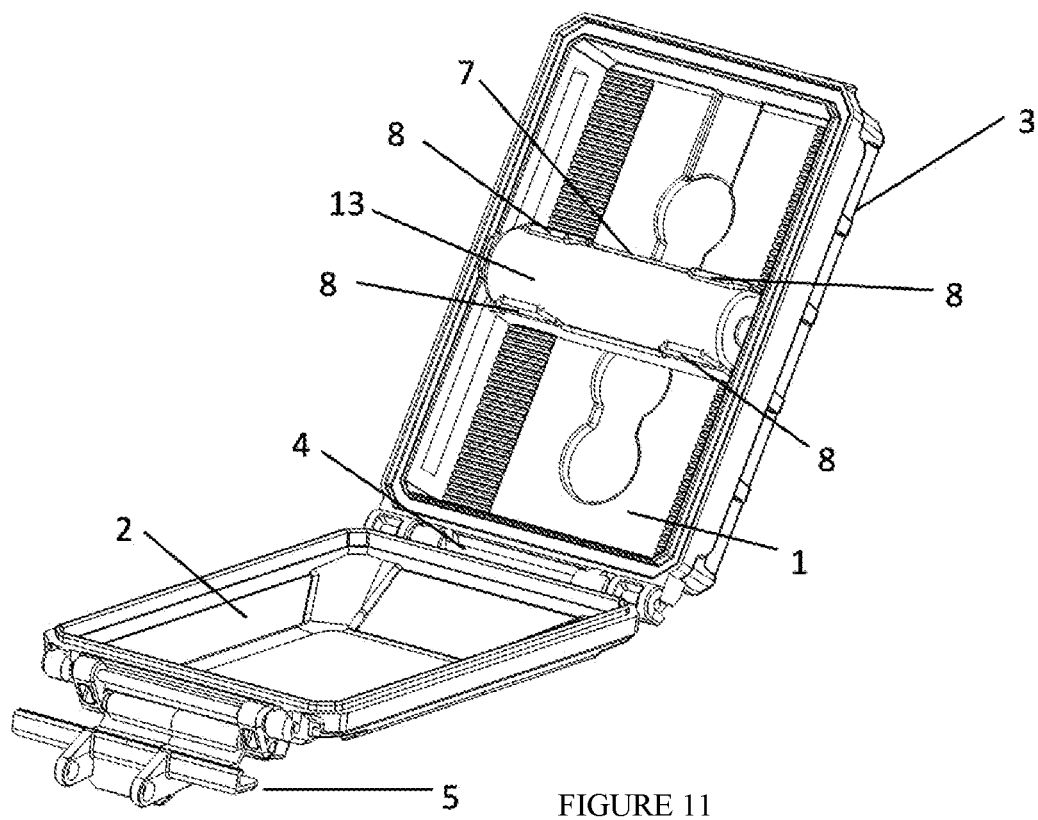
FIG. 11 is a perspective illustration of a portable battery container in accordance with one or more embodiments in an open configuration with an insertable structure and battery attached internally.

FIG. 11. shows a perspective illustration of an embodiment of a protective battery container 1 with an insertable structure 7 releasably attached to a back hollow structure 3. Further a battery 13 is releasably accepted and retained within the insertable structure 7. The battery 13 is attached to the insertable structure 7 by way of flexible protrusions 8.

Figure 12:
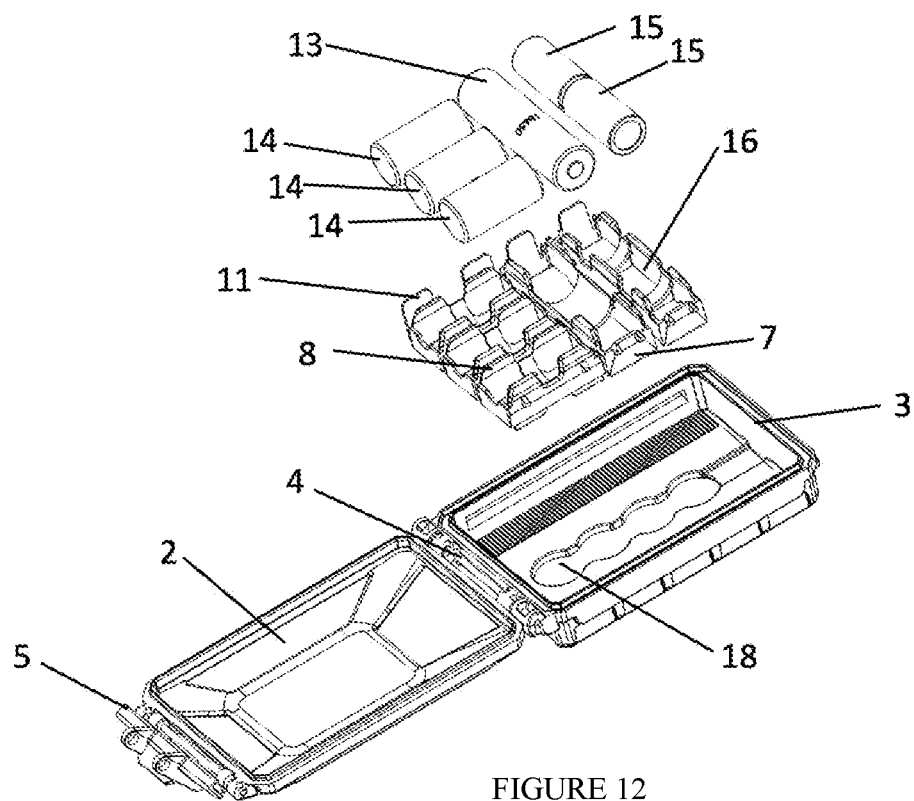
FIG. 12 is an exploded perspective illustration of a portable battery container in accordance with one or more embodiments in an open configuration with insertable structures and batteries.

FIG. 12 shows an exploded perspective illustration of an embodiment of a protective battery container 1 wherein the front hollow structure 2 and a back hollow structure 3 are rotated apart, opening the container. Further present are multiple insertable structures 7, 11, 16 of various sizes and configurations, configured as described above. Additionally multiple batteries 13, 14, 15 of various sizes and quantities are present of generally cylindrical shape. These batteries are representative of batteries currently available in commercially standardized sizes at the time of writing such as 18650 (13), 18350 (14) and CR123 (15) lithium-ion batteries but additional insertable structures have been conceived of, and may be configured to accept other commercially available batteries such as size AA, AAA, 9-Volt, and many others as known by those skilled in the art. Furthermore, other embodiments may include insertable structures configured using flexible protrusions 8 as described above, to hold batteries of alternate shapes such as rectangular extrusions or any other shape as known to those skilled in the art.

Figure 13:
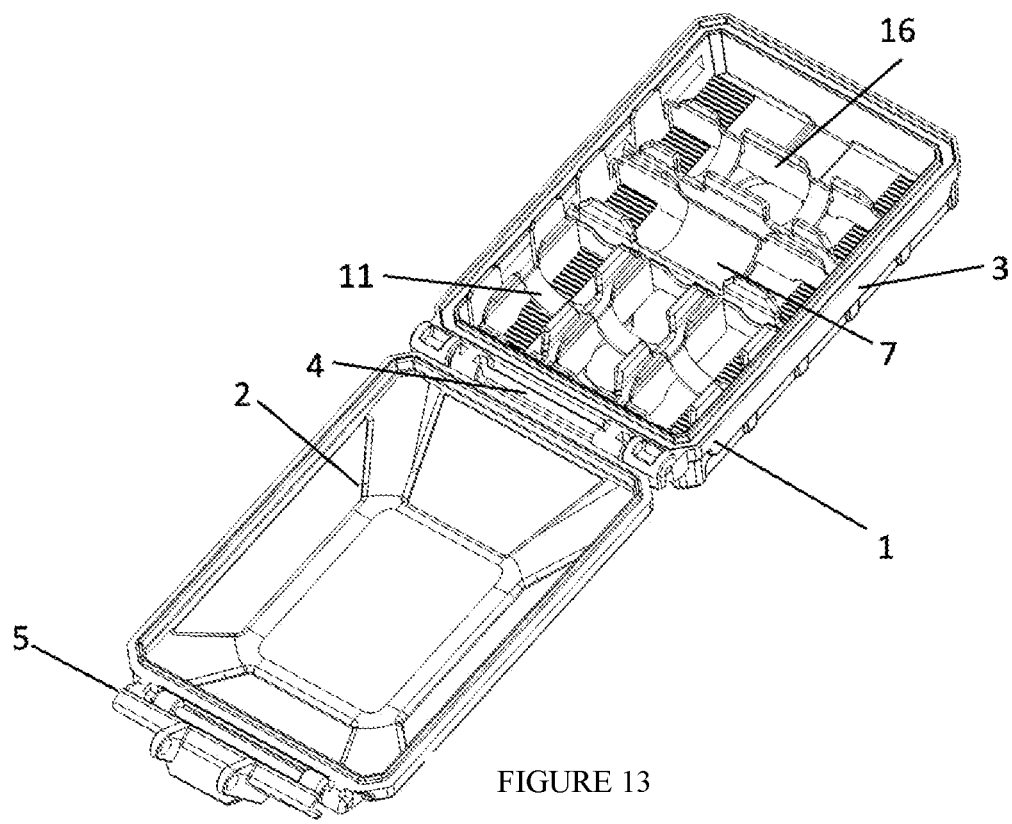
FIG. 13 is a perspective illustration of a portable battery container in accordance with one or more embodiments in an open configuration with multiple insertable structures attached internally.

FIG. 13 shows a perspective illustration of an embodiment of a protective battery container 1 with insertable structures 7, 11, and 16 releasably attached to a back hollow structure 3. The configuration of insertable structures within the hollow structure represent one of many configurations possible. Each additional configuration can be created by the addition, removal, or repositioning of the insertable structures within the hollow structure.

Figure 14:
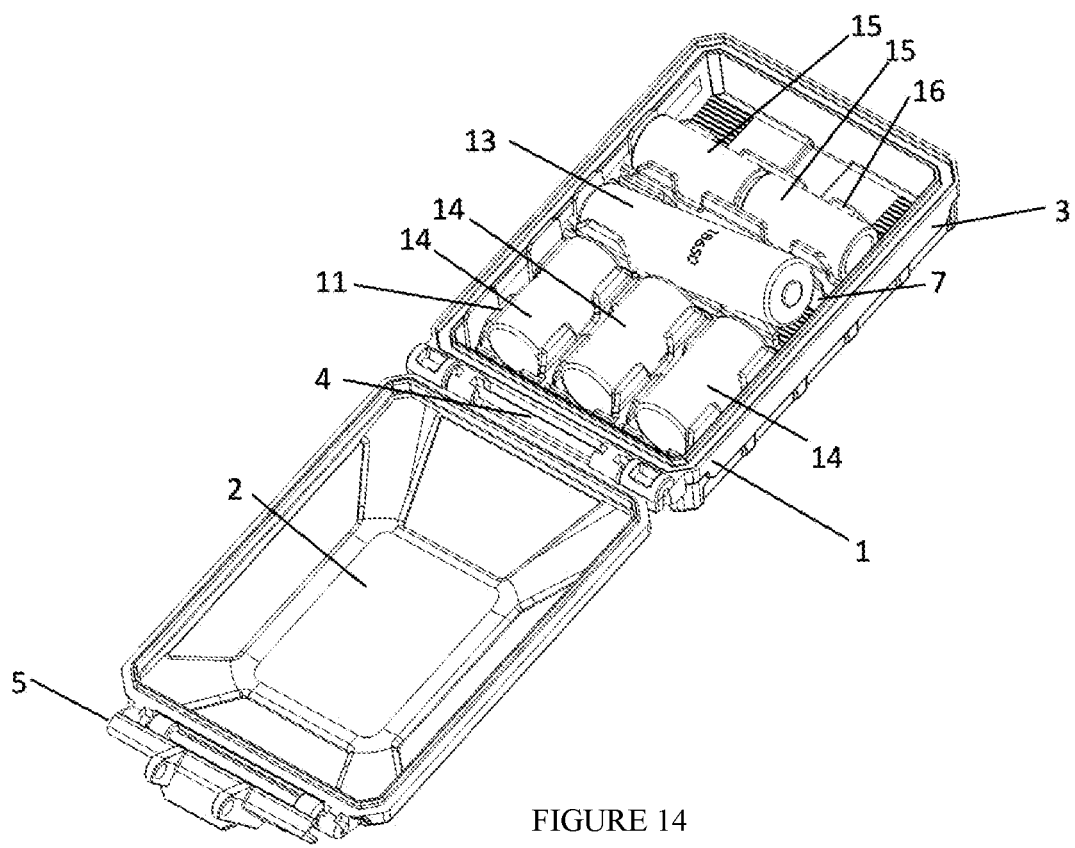
FIG. 14 is a perspective illustration of a portable battery container in accordance with one or more embodiments in an open configuration with multiple insertable structures and batteries attached internally.

FIG. 14 shows a perspective illustration of an embodiment of a protective battery container 1 with insertable structures 7, 11, and 16 releasably attached to a back hollow structure 3. Further, multiple batteries 14, 15 of differing sizes are releasably accepted into the insertable structures 11 and 16. Furthermore, for illustrative purposes, a battery 13 is partially accepted by and insertable structure 7. The battery 13, can be removed from the insertable structure 7 if the user applies pressure to one end of the battery 13, thus causing the battery to pivot around the center portion of the insertable structure 7. Upon application of said pressure, the opposite end of the battery 13 will be released from the insertable structures' flexible protrusions, allowing the user to then grasp said opposite side end of the battery 13 and fully remove it from the insertable structure 7. This method of removal and or insertion can be utilized for batteries 14 within insertable structure 11 and for batteries 15 within insertable structure 16.

Figure 15:
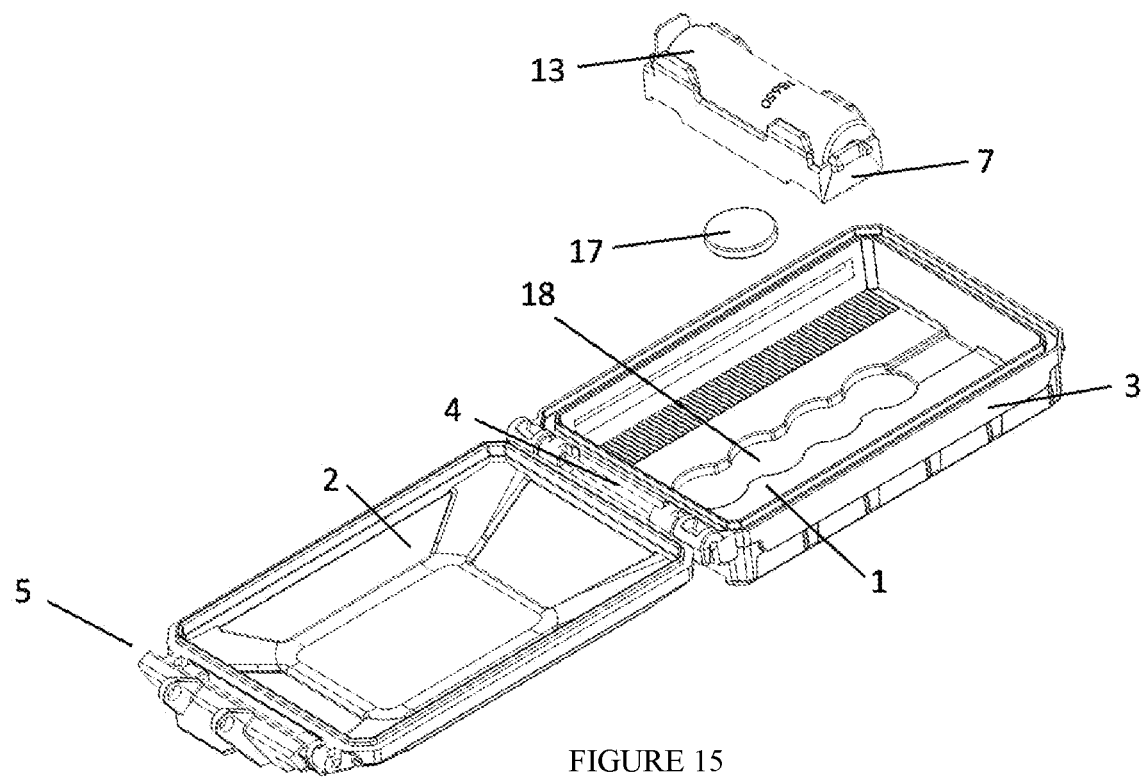
FIG. 15 is an exploded perspective illustration of a portable battery container in accordance with one or more embodiments in an open configuration with an insertable structure and batteries.

FIG. 15. shows an exploded perspective illustration of an embodiment of a protective battery container 1 in an open configuration. Further a coin-style battery 17 and an insertable structure 7 are shown. The battery 13 is accepted within the insertable structure 7. Further a recessed cavity 18, in the inner surface of the protective battery container's hollow cavity of the back hollow structure 3 is present and sized such to accept the coin-style battery 17.

Figure 16:
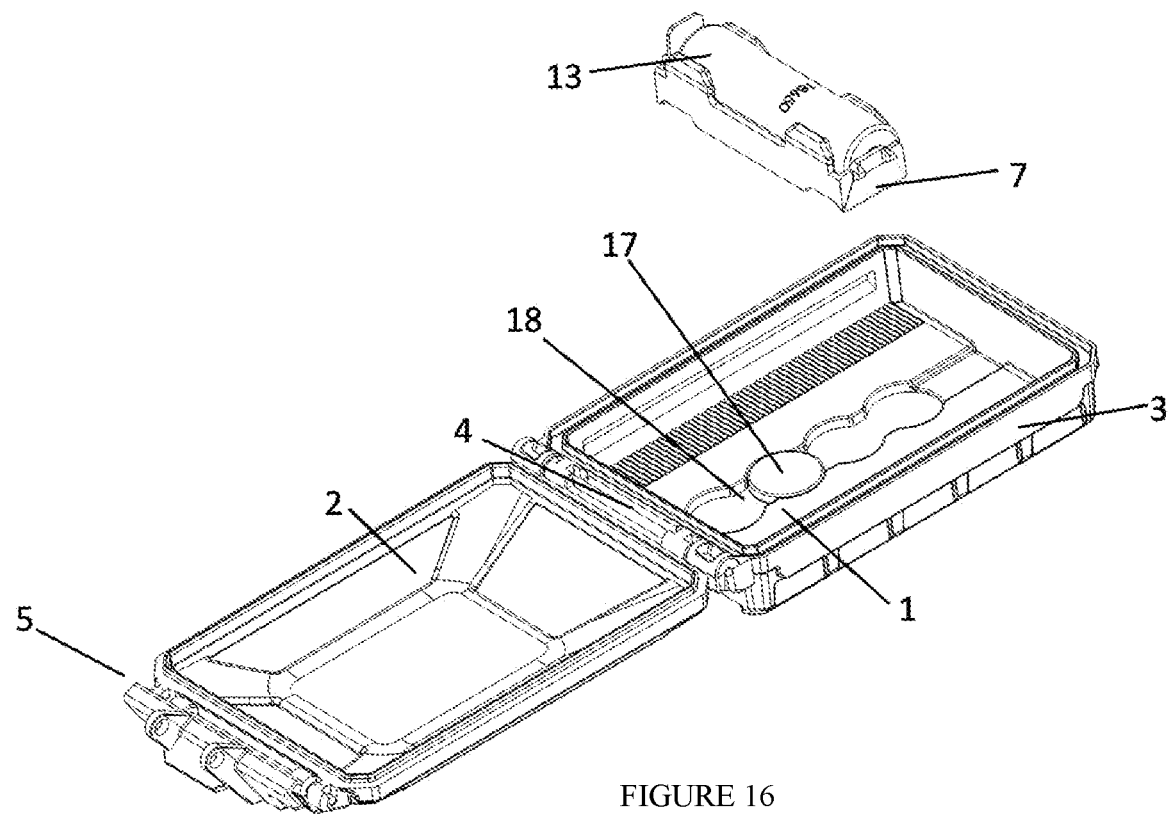
FIG. 16 is a partially exploded perspective illustration of a portable battery container in accordance with one or more embodiments in an open configuration with an insertable structure and batteries.

FIG. 16. shows a partially exploded perspective illustration of an embodiment of a protective battery container 1 in an open configuration. Further a coin-style battery 17 and an insertable structure 7 are shown. A battery 13 is accepted within the insertable structure 7. Further, a recessed cavity 18, in the inner surface of the protective battery container's hollow cavity of the back hollow structure 3 is present and has accepted and partially constrained the coin-style battery 17.

Figure 17:
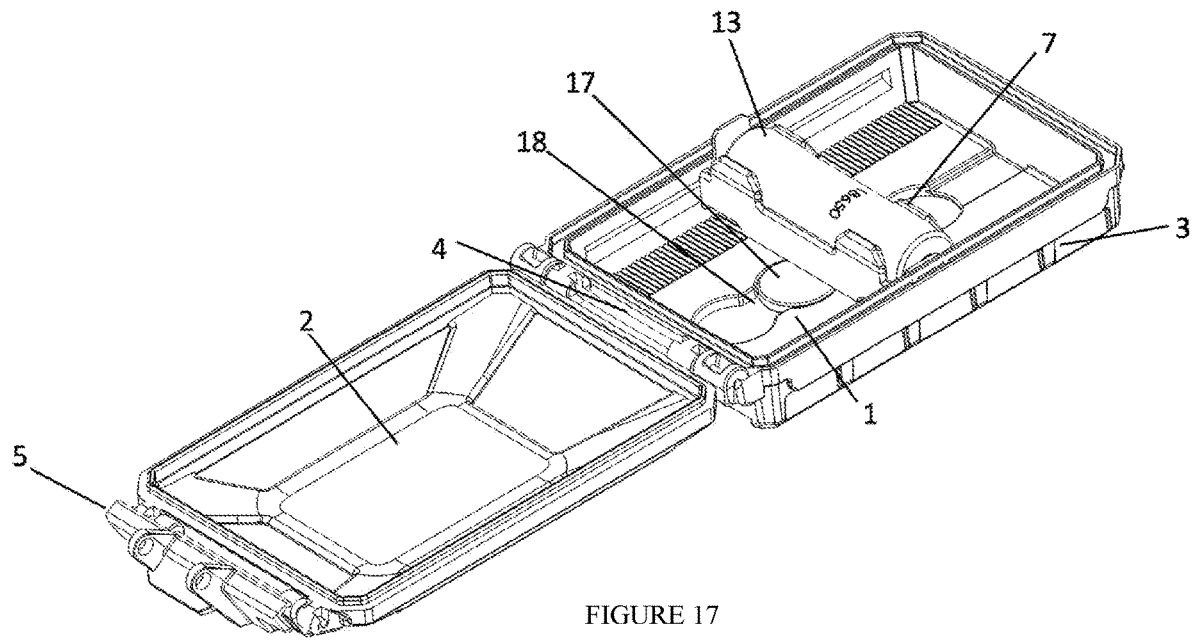
FIG. 17 is perspective illustration of a portable battery container in accordance with one or more embodiments in an open configuration with an insertable structure and batteries.

FIG. 17. shows a perspective illustration of an embodiment of a protective battery container 1 in an open configuration. An insertable structure 7 is attached to a hollow structure 3. A battery 13 is accepted within the insertable structure 7. A recessed cavity 18, in the inner surface of the protective battery container's hollow cavity of the back hollow structure 3 is present and has accepted the coin-style battery 17. The positioning of the insertable structure relative to the coin-style battery allows the insertable structure to fully constrain the coin-style battery. Additional recessed cavities are conceived that could hold similar coin-style batteries or other different-sized batteries including cylindrical or rectangular batteries. Although coin-style batteries are common at the time of writing in commercially standardized sizes such as 2032 and 1632, similar configurations are conceived that would allow the insertable structure 7 and recessed cavity 18 to accept alternate sized or alternate shaped batteries as known to those skilled in the art.

Figure 18:
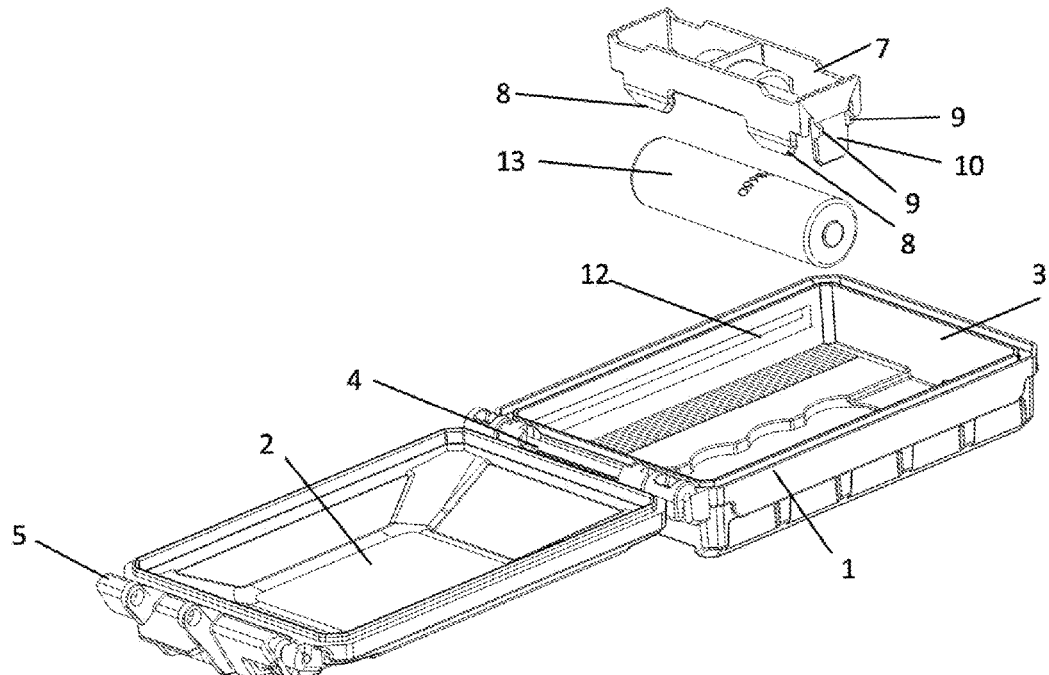
FIG. 18 is an exploded perspective illustration of a portable battery container in accordance with one or more embodiments in an open configuration with an inverted insertable structure and battery.

FIG. 18 shows an exploded perspective illustration of an embodiment of a protective battery container 1 in an open configuration. An insertable structure 7 and a battery 13 are also shown. Alternate to configurations described previously, the battery 13 and insertable structure 7 are oriented such that the battery is closer to the hollow structure 3 of the protective battery container 1 and the insertable structure 7 is pictured on the opposite side of the battery 13 with flexible protrusions 8 facing the battery 13.

Figure 19:
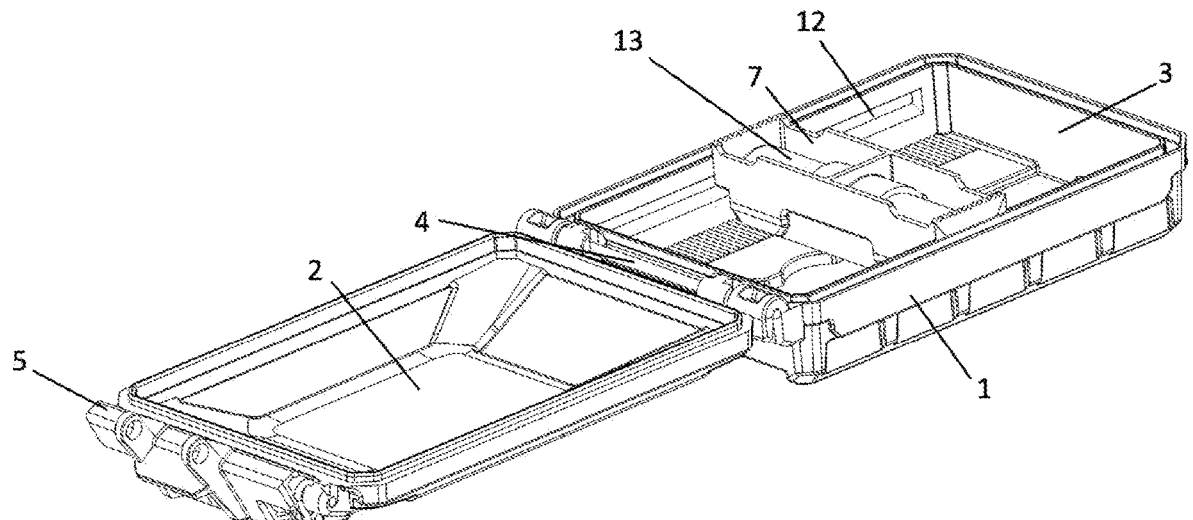
FIG. 19 is a perspective illustration of a portable battery container in accordance with one or more embodiments in an open configuration with an inverted insertable structure and battery.

FIG. 19 shows a perspective illustration of an embodiment of a protective battery container 1 in an open configuration. An insertable structure 7 is attached to a hollow structure 3 such that it captures a battery 13 between the insertable structure 7 and the hollow structure 3. This configuration is intended to be an alternate to previously described configurations of the same elements. The advantage of this configuration is that it provides a visual and tactile indicator to the user that is different than the configuration in which the battery is exposed and able to be released as pictured in FIG. 14. One application of this configuration includes indicating that a battery is no longer fully charged and therefore should not be utilized until it can be recharged.

Figure 20:
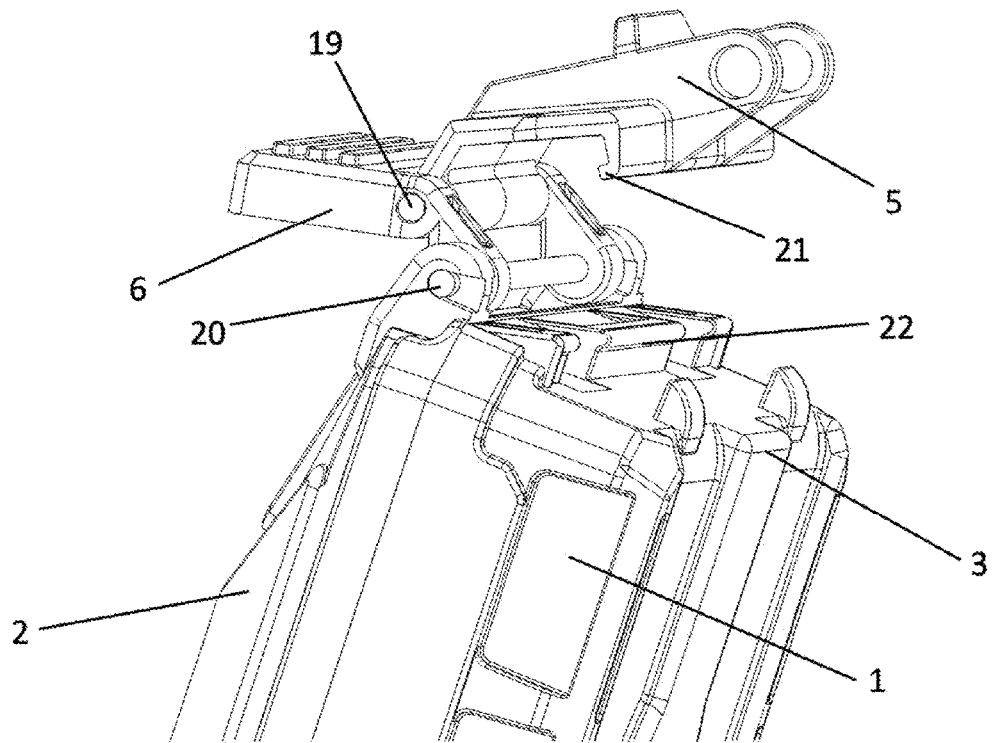
FIG. 20 is a partial perspective illustration of a portable battery container in accordance with one or more embodiments with an open latch mechanism.

FIG. 20 shows a partial perspective illustration of an embodiment of a protective battery container 1 in a closed configuration. An open latch 5 with interlocking member 21 pivotally attached by way of a hinge pin 19 to a latch handle 6 is also pictured. The latch handle 6 is pivotally attached by a second hinge pin 20 to a front hollow structure 2, allowing the latch 5 and latch handle 6 to be rotated relative to a back hollow structure 3. Further, the back hollow structure 3 includes a protruded latching surface 22 able to engage the interlocking member 21 on the latch 5.

Figure 21:
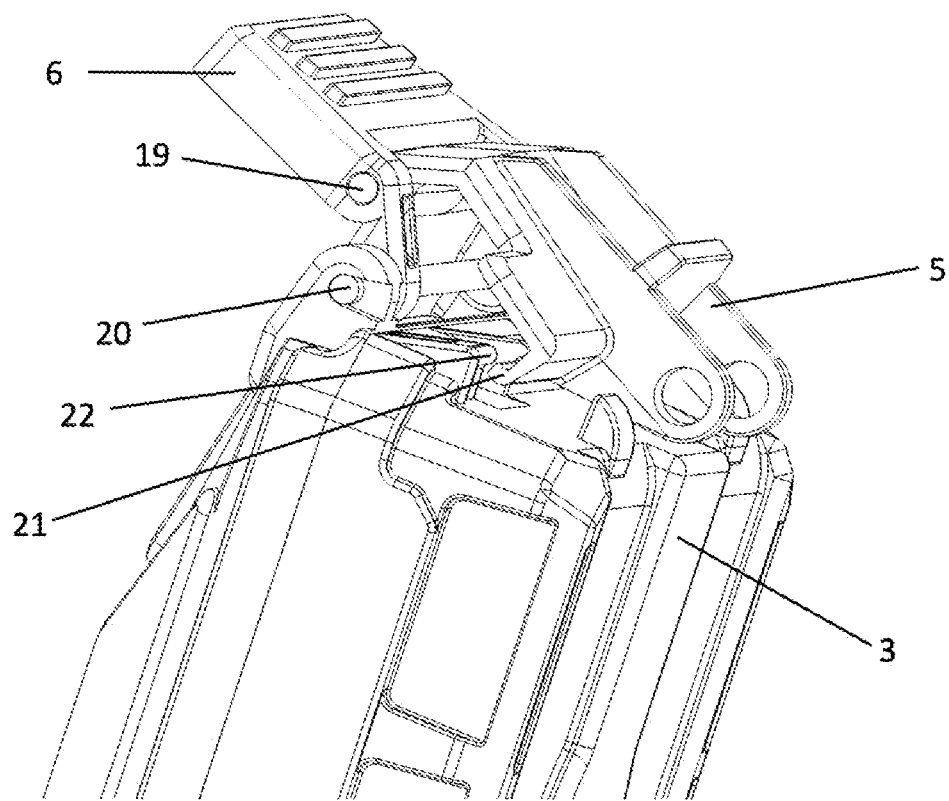
FIG. 21 is a partial perspective illustration of a portable battery container in accordance with one or more embodiments with a partially closed latch mechanism.

FIG. 21 shows a partial perspective illustration of an embodiment of a protective battery container 1 in a closed configuration. A partially open latch 5 with interlocking member 21 is engaged with a latching surface 22 on a back hollow structure 3. Once the interlocking member 21 and latching surface 22 are engaged as pictured, the latch handle 6 can be rotated towards the front hollow structure 2 causing the hinge pin 19 to cross the plane created by the interlocking member 21 and the second hinge pin 20, thus creating an over-center condition as known to those skilled in the art. Once the over-center condition is created, the protective battery container's hollow structures will remain locked together. Conversely, lifting the handle 6 away from the front hollow structure 2, the over-center condition can be removed, allowing the interlocking member 21 and latching surface 22 to be separated and the front hollow structure 2 and back hollow structure 3 to be opened.

Figure 22:
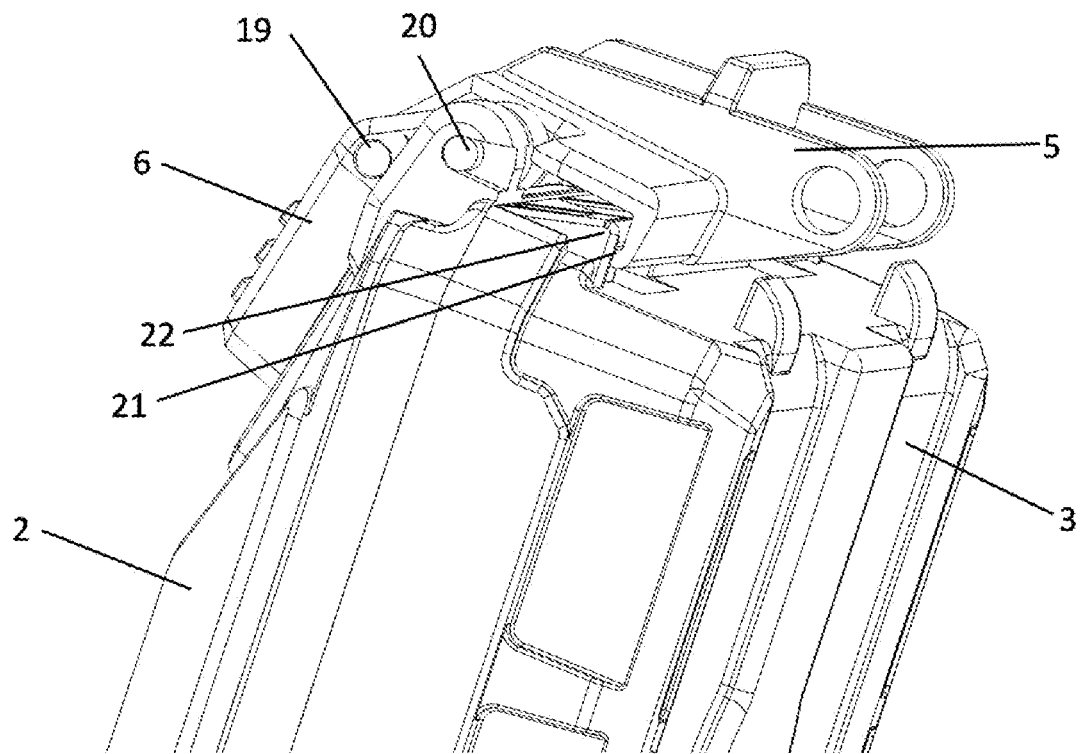
FIG. 22 is a partial perspective illustration of a portable battery container in accordance with one or more embodiments with a fully closed latch mechanism.

FIG. 22 shows a partial perspective illustration of an embodiment of a protective battery container 1 in a closed and locked configuration. A latch 5 with interlocking member 21 is engaged with a latching surface 22 on a back hollow structure 3. As previously described, and over-center condition created by the orientation of the hinge pins 19, 20 causes releasable tension that apposes the front hollow structure 2 and back hollow structure 3 thus locking the protective battery container 1 in a closed configuration.

Figure 23:
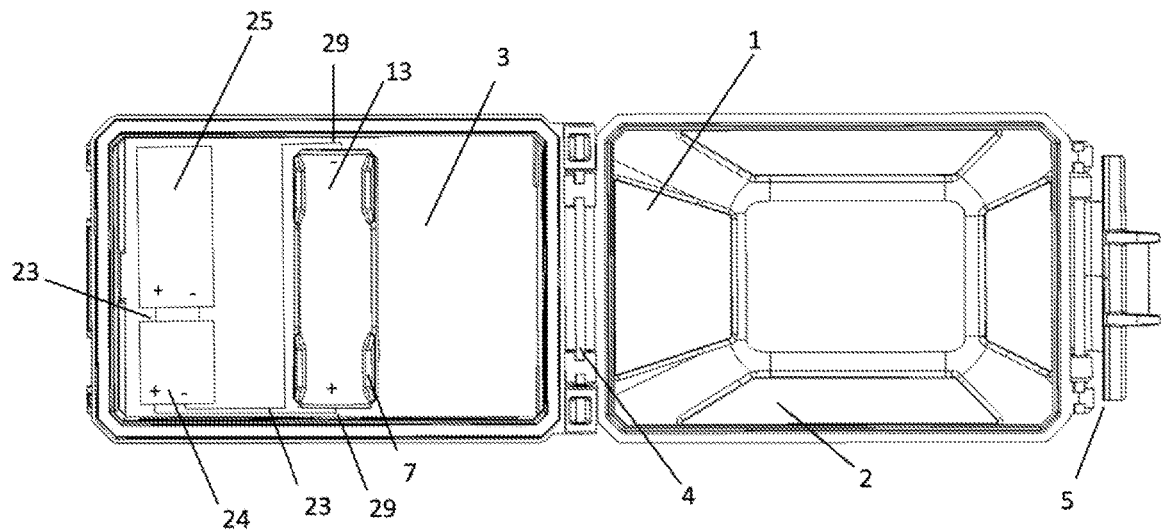
FIG. 23 is a top-view schematic illustration of a portable battery container in accordance with one or more embodiments including internal battery charging components and an onboard battery.

FIG. 23 shows a top view illustration of an embodiment of a protective battery container 1 in an open configuration. Attached within the hollow structure 3 of the protective battery container is a battery 13 accepted within an insertable structure 7. Further the insertable structure has releasable conductive connectors 29 that electrically connect the battery's terminals to conductive pathways 23 to a charge controller 24. The charge controller 24 can be comprised of printed circuit boards, integrated circuit chips, resistors, capacitors and other components configured to sense the charge status of the battery 13 and recharge the battery from an additional onboard battery source 25 also connected to the charge controller 24. The onboard battery source 25 may be recharged as necessary from other energy sources such as household alternating current (wall outlet) or other similar sources. The conductive connectors 29 may be comprised of metallic springs, magnets, plugs and other components known to those skilled in the art to create temporary electrical connections between the insertable structure 7, battery 13 and the conductive pathways 23. The onboard battery source 25 may be permanently attached to the hollow structure 3 or removable by the user. Additionally, this charging system can be used to provide recharging capability to multiple batteries accepted in multiple insertable structures such that the user can recharge batteries while using the case to transport or store batteries.

Figure 24:
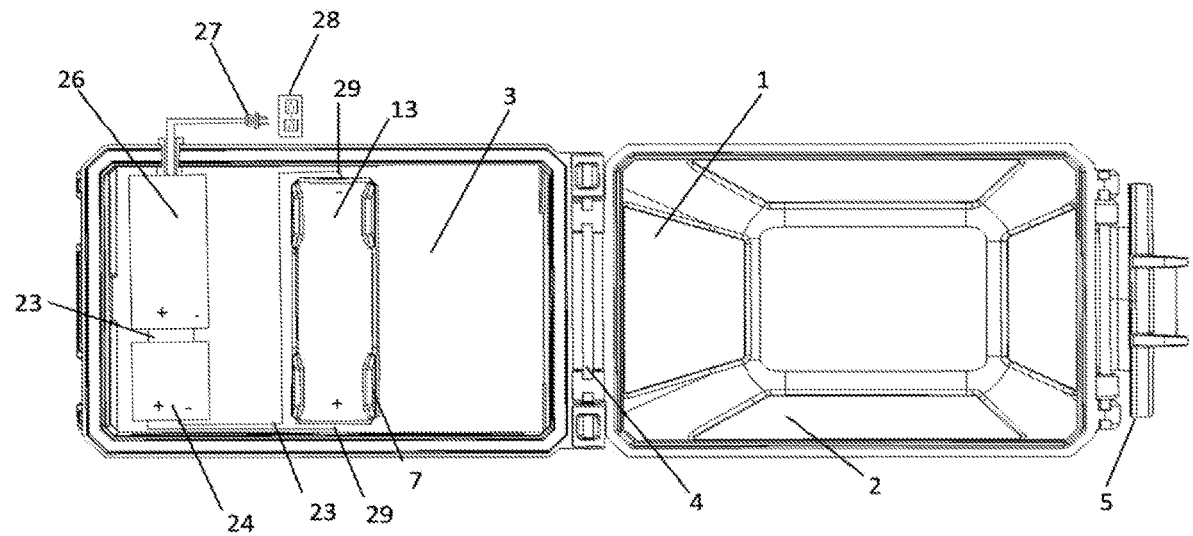
FIG. 24 is a top-view schematic illustration of a portable battery container in accordance with one or more embodiments including internal battery charging components and an external power source.

FIG. 24 shows a top view illustration of an embodiment of a protective battery container 1 in an open configuration. Attached within the hollow structure 3 of the protective battery container is a battery 13 accepted within an insertable structure 7. Further, the insertable structure has releasable conductive connectors 29 that electrically connect the battery's terminals to conductive pathways 23 to a charge controller 24. This charge controller 24 can be comprised of printed circuit boards, integrated circuit chips, resistors, capacitors and other components configured to sense the charge status of the battery 13 and recharge the battery 13 from an alternating current to direct current (AC/DC) converter 26. The AC/DC converter is further connected to a wall outlet plug 27 that can be engaged in a standard household wall outlet 28. The household power can be conducted to the AC/DC converter 26 through the wall outlet plug 27, and sent to the battery 13 by the charge controller 24. Additionally, this charging system can be used to provide recharging capability to multiple batteries accepted in multiple insertable structures such that the user can maintain fully charged batteries.

Figure 25:
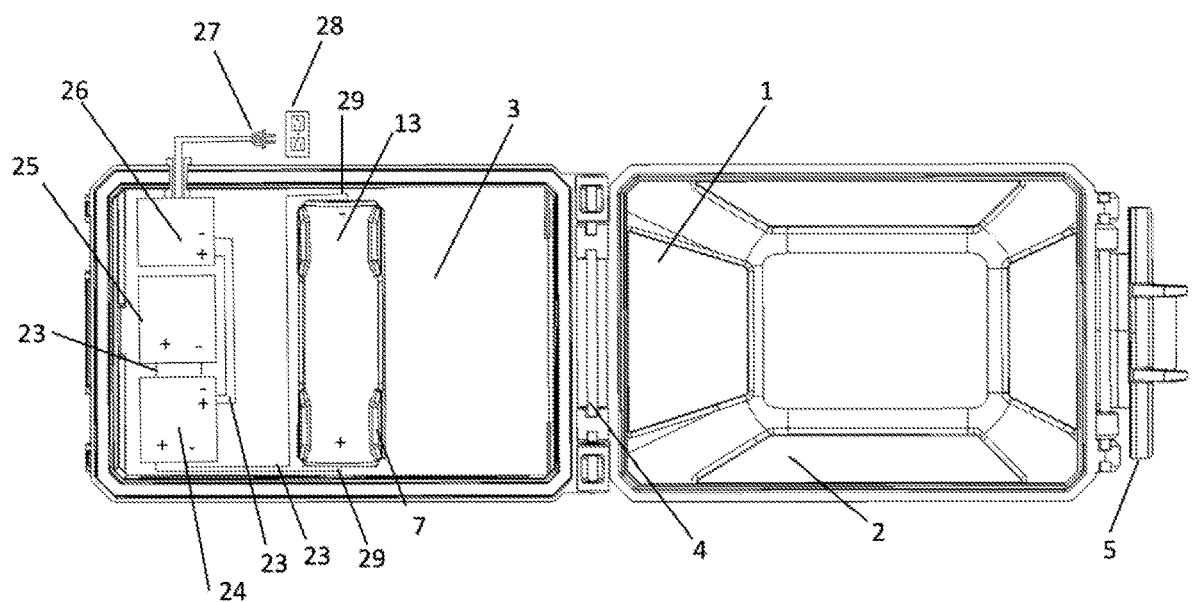
FIG. 25 is a top-view schematic illustration of a portable battery container in accordance with one or more embodiments including internal battery charging components, onboard battery, and an external power source.

FIG. 25 shows a top view illustration of an embodiment of a protective battery container 1 in an open configuration. Attached within the hollow structure 3 of the protective battery container is a battery 13 accepted within an insertable structure 7. Further, the insertable structure has releasable conductive connectors 29 that electrically connect the battery's terminals to conductive pathways 23 to a charge controller 24. This charge controller 24 can be comprised of printed circuit boards, integrated circuit chips, resistors, capacitors and other components configured to sense the charge status of the battery 13 and recharge the battery from an alternating current to direct current (AC/DC) converter 26. The AC/DC converter is further connected to a wall outlet plug 27 that can be engaged in a standard household wall outlet 28. The household power source can be conducted to the AC/DC converter 26 through the wall outlet plug 27, and sent to the battery 13 by the charge controller 24. Additionally, this charging system can be used to provide recharging capability to multiple batteries accepted in multiple insertable structures such that the user can maintain fully charged batteries prior to use. Further, an onboard battery source 25 is electrically connected to the charge controller 24 such that the battery 13 can be recharged alternately from the onboard battery source instead of the AC/DC converter 26. Additionally, the onboard battery source 25 can be charged by the AC/DC converter 26 when connected to and external power source via a wall outlet plug 27 and wall outlet 28. Alternate embodiments include configurations with multiple insertable structures and batteries within a case, each able to be charged from onboard battery sources or external power sources.

Further envisioned are visual charging indicators such as light emitting diodes placed either inside the hollow structures, on the insertable structures, on the charge controller, or alternately placed on the outside surfaces of the hollow structures and connected in each case with conductive pathways to the battery's housed in the hollow structures and the charge controller such that the status of each battery can be communicated to the user either by changing the color of the light emitting diode or by intermittently flashing the light emitting diode on and off in specific patterns.

Still further envisioned is a compressible gasket member attached to a back hollow structure continuously apposed to the opening of said structure's hollow cavity. A front hollow structure with a protrusion continuously present around the opening of said structures hollow cavity. When the front hollow structure and back hollow structure's cavities are apposed, the gasket is compressed by the front hollow structure's continuous protrusion, sealing the cavity formed by the hollow structures from dirt, dust, water, and other environmental particulate or fluid. In another embodiment, the front hollow structure contains the gasket member and the back hollow structure contains the continuous protrusion.

In one aspect, the present technology can include a container system that can include a first hollow structure, a second hollow structure and at least one insertable structure. The first hollow structure and the second hollow structure can be pivotably associated with each other to permit relative rotation and opening and closing of the first hollow structure and the second hollow structure. The first hollow structure and the second hollow structure can be apposed to each other and configured to create a sealed cavity when in a closed position. The insertable structure can be configured to accept a battery and can be able to be releasably attached to at least one of the first hollow structure and the second hollow structure.

In another aspect, the present technology can include a container system that can include a first hollow structure, a second hollow structure and at least one insertable structure. The first hollow structure and the second hollow structure can be pivotably associated with each other to permit relative rotation and opening and closing of the first hollow structure and the second hollow structure. The first hollow structure and the second hollow structure can be apposed to each other and configured to create a sealed cavity when in a closed position. The insertable structure can be configured to accept one or more batteries and can be able to be releasably attached to at least one of the first hollow structure and the second hollow structure. At least one of the first hollow structure and the second hollow structure can house an electronic charge controller module in releasable electrical contact with at least one of the batteries through conductive pathways in the first hollow structure, the second hollow structure and the insertable structure.

In still another aspect, the present technology can include a device that can include a first hollow structure, as second hollow structure and at least one insertable structure. The first hollow structure and the second hollow structure can be pivotably associated with each other to permit relative rotation and opening and closing of the first hollow structure and the second hollow structure. The first hollow structure and the second hollow structure can be apposed to each other and can be configured to create a sealed cavity when in a closed position. The insertable structure can be configured to accept a battery and able to be releasably attached to at least one of the first hollow structure and the second hollow structure.

In some or all embodiments, the insertable structure can include a distal end and a proximal end. The distal end can have at least one distal end locking protrusion configured to engage a first recessed cavity of the second hollow structure. The proximal end can have a cantilevered member with a least one proximal end locking protrusion configured to engage a second recessed cavity of the second hollow structure.

In some or all embodiments, the insertable structure can include a distal end and a proximal end, and at least one flexible protrusion perpendicular to an axis of the insertable structure forming a concavity that can accept and retain the battery or batteries.

Some or all embodiments of the present technology can include a hinge located along a first side of the first hollow structure and the second hollow structure to permit the relative rotation and opening and closing of the first hollow structure and the second hollow structure.

Some or all embodiments of the present technology can include a latch on a second side of the first hollow structure opposite the first side. The latch can be releasably engageable with a locking member of the second hollow structure.

In some or all embodiments, the insertable structure can be configured to be releasably attached to at least one of the first hollow structure and the second hollow structure in an orientation that provides access to the accepted battery within the insertable structure.

In some or all embodiments, the insertable structure can be configured to be alternately oriented to prevent access to the battery within the insertable structure.

In some or all embodiments, at least one recessed cavity within the second hollow structure can be configured to accept the battery or batteries.

In some or all embodiments, the insertable structure that can be releasably attached to the second hollow structure further constraining the battery or batteries while the insertable structure attached to the second hollow structure.

Some or all embodiments of the present technology can include an electric charge controller housed in at least one of the first hollow structure and the second hollow structure. The electronic charge controller module can be in releasable electrical contact with at least one of the batteries through conductive pathways in the first hollow structure, the second hollow structure and the insertable structure.

In some or all embodiments, the electronic charge controller can be configured or configurable to sense a charge status of the at least one of the batteries and recharge the at least one of the batteries from an external energy source connected to the electronic charge controller.

In some or all embodiments, the external energy source can be a battery source housed in the least one of the first hollow structure and the second hollow structure.

Although the present technology has been disclosed in the context of certain preferred embodiments and examples, it will be understood by those skilled in the art that the present technology extends beyond the specifically disclosed embodiments to other alternative embodiments and/or uses of the present technology and obvious modifications and equivalents thereof. Thus, it is intended that the scope of the present technology herein disclosed should not be limited by the particular disclosed embodiments described above, but should be determined only by a fair reading of the claims that follow.

There has thus been outlined, rather broadly, features of the present technology in order that the detailed description thereof that follows may be better understood and in order that the present contribution to the art may be better appreciated.

Numerous objects, features and advantages of the present technology will be readily apparent to those of ordinary skill in the art upon a reading of the following detailed description of the present technology, but nonetheless illustrative, embodiments of the present technology when taken in conjunction with the accompanying drawings.

As such, those skilled in the art will appreciate that the conception, upon which this disclosure is based, may readily be utilized as a basis for the designing of other structures, methods and systems for carrying out the several purposes of the present technology. It is, therefore, that the claims be regarded as including such equivalent constructions insofar as they do not depart from the spirit and scope of the present technology.

It is another object of the present technology to provide a new and novel protective battery containers that may be easily and efficiently manufactured and marketed.

An even further object of the present technology is to provide a new and novel protective battery containers that has a low cost of manufacture with regard to both materials and labor, and which accordingly is then susceptible of low prices of sale to the consuming public, thereby making such protective battery containers economically available to the buying public.

Still another object of the present technology is to provide a new protective battery containers that provide in the apparatuses and methods of known technology some of the advantages thereof, while simultaneously overcoming some of the disadvantages normally associated therewith.

These together with other objects of the present technology, along with the various features of novelty that characterize the present technology, are pointed out with particularity in the claims annexed to and forming a part of this disclosure. For a better understanding of the present technology, its operating advantages and the specific objects attained by its uses, reference should be made to the accompanying drawings and descriptive matter in which there are illustrated embodiments of the present technology. Whilst multiple objects of the present technology have been identified herein, it will be understood that the claimed present technology is not limited to meeting most or all of the objects identified and that some embodiments of the present technology may meet only one such object or none at all.

While embodiments of the protective battery containers have been described in detail, it should be apparent that modifications and variations thereto are possible, all of which fall within the true spirit and scope of the present technology. With respect to the above description then, it is to be realized that the optimum dimensional relationships for the parts of the present technology, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present technology. For example, any suitable sturdy material may be used instead of the above-described. And although protective battery containers have been described, it should be appreciated that the present technology herein described is also suitable for storing any battery within a protective container.

Therefore, the foregoing is considered as illustrative only of the principles of the present technology. Further, since numerous modifications and changes will readily occur to those skilled in the art, it is not desired to limit the present technology to the exact construction and operation shown and described, and accordingly, all suitable modifications and equivalents may be resorted to, falling within the scope of the present technology.

What is claimed as being new and desired to be protected by Letters Patent of the United States is as follows:

1. A battery organization system, comprising:
a first hollow structure and a second hollow structure pivotably associated with each other to permit relative rotation;
wherein the first hollow structure and the second hollow structure are configurable between an open configuration and a closed configuration;
wherein in the open configuration, the first hollow structure and the second hollow structure are rotated apart;
wherein in the closed configuration, the first hollow structure and second hollow structure are closed together to create a sealed cavity therebetween, the sealed cavity comprising an interior of the first hollow structure and the second hollow structure;
wherein the battery organization system consists of a standalone portable battery container system without any battery-powered electronic equipment; and
wherein the battery organization system further comprises a plurality of modular insertable structures;
wherein each of the plurality of modular insertable structures is configured to accept at least one battery and is interchangeably attachable side-by-side, wherein any two or more of the plurality of modular insertable structures are each configured to attach to and traverse opposing sides of said interior in a side-by-side arrangement;
wherein the plurality of modular insertable structures comprises at least three modular structures including at least one first modular insertable structure and at least one second modular insertable structure; and
wherein the at least one first modular insertable structure is configured to accept lengthwise at least one first battery of a first size;
wherein the at least one second modular insertable structure is configured to accept side by side a plurality of second batteries of a second size different from the first size; and
whereby, when the first modular insertable structure and the second modular insertable structure are attached side by side to the interior and the at least one first battery and the second batteries are accepted respectively in the first module insertable structure and the second modular insertable structure, the at least one first battery is orientated to traverse across the interior, and the plurality of second batteries are oriented side-by-side with the at least one first battery.

2. The battery organization system of claim 1, wherein the first hollow structure and second hollow structure is further configured to accept a coin-style battery, and
wherein each of the plurality of modular insertable structures while releasably attached to the first hollow structure and/or the second hollow structure is configured to constrain the coin style battery between the modular insertable structure and an inner surface of the first hollow structure or an inner surface of the second hollow structure.

3. The battery organization system of claim 1, wherein the third modular insertable structure is configured to accept at least one third battery being a different size and/or configuration from the at least one first battery and second batteries.

4. The battery organization system of claim 1, wherein the plurality of second batteries oriented side-by-side with the at least one first battery are orthogonal in orientation to the at least one first battery.

5. The battery organization system of claim 1, further comprising a hinge located along a first side of the first hollow structure and the second hollow structure to permit the relative rotation and opening and closing of the first hollow structure and second hollow structure.

6. The battery organization system of claim 5, further comprising a latch on a second side of the first hollow structure the opposite the first side of the first hollow structure, the latch being releasably engageable with a locking member associated with the second hollow structure.

7. The battery organization system of claim 1, wherein at least one of the plurality of modular insertable structures includes a distal end and a proximal end, the distal end having at least one distal end locking protrusion configured to engage a first recessed cavity of the first hollow structure and/or second hollow structure, the proximal end having a cantilevered member with a least one proximal end locking protrusion configured to engage a second recessed cavity of the at least one of the first hollow structure and second hollow structure.

8. The battery organization system of claim 1, wherein at least one modular insertable structure of the plurality of modular insertable structures includes a distal end and a proximal end, and at least one flexible protrusion perpendicular to an axis of the at least one modular insertable structure, the at least one flexible protrusion forming a concavity configured to accept and retain the at least one battery.

9. The battery organization system of claim 1, wherein at least one modular insertable structure of the plurality of modular insertable structures is configured to be releasably attached to the first hollow structure and/or the second hollow structure in an orientation that provides access to the at least one battery within the at least one modular insertable structure; and wherein the at least one modular insertable structure is configured to be alternately oriented to prevent access to the at least one battery within the at least one modular insertable structure while the at least one modular insertable structure is attached to the first hollow structure and/or second hollow structure.

10. The battery organization system of claim 9, wherein at least one recessed cavity within the first hollow structure and/or second hollow structure is configured to accept the at least one battery; wherein the at least one modular insertable structure of the plurality of modular insertable structures is further configured to constrain the at least one battery accepted in the at least one module insertable structure in the at least one recessed cavity while the at least one modular insertable structure is attached to the first hollow structure and/or second hollow structure.

11. The battery organization system of claim 1, wherein at least one modular insertable structure of the at least one of the plurality of modular insertable structures includes a distal end and a proximal end, and at least one flexible protrusion perpendicular to an axis of the at least one modular insertable structure, the at least one flexible protrusion forming a concavity configured to accept and retain the at least one battery and allowing a the user to access the at least one battery accepted in the at least one modular insertable structure while the at least one modular insertable structure is attached to the first hollow structure and/or the second hollow structure.

12. The battery organization system of claim 11, wherein the at least one modular insertable structure is further configured to attach to the first hollow structure and/or second hollow structure in an alternate orientation such that the at least one battery accepted in the at least one modular insertable structure is constrained between an inner surface of the first hollow structure or second hollow structure and the at least one modular insertable structure preventing the user from accessing the at least one battery while the at least one modular insertable structure is attached to the first hollow structure and/or the second hollow structure.

13. The battery organization system of claim 1, wherein at least one of the first hollow structure and the second hollow structure houses an electronic charge controller module configured to be in releasable electrical contact with the at least one battery through conductive pathways in the at least one of the first hollow structure and the second hollow structure and at least one of the plurality of modular insertable structures.

14. The battery organization system of claim 13, wherein the electronic charge controller is configured or configurable to sense a charge status of the at least one battery and recharge the at least one battery from an external energy source connected to the electronic charge controller module.

15. The battery organization system of claim 1, wherein the first modular insertable structure is configured to accept lengthwise a plurality of the first batteries in series side-by-side; whereby, when the at least one first modular insertable structure and the at least one second modular insertable structure are attached side by side to the interior and the first batteries and the second batteries are accepted respectively in the first module insertable structure and second modular insertable structure, the first batteries are orientated in series along the length of the first module insertable structure and traverse across the interior, and the plurality of second batteries are oriented side-by-side with the at least one first battery.

16. The battery organization system of claim 15, wherein the second modular insertable structure is configured to accept in parallel side-by-side the plurality of second batteries.

17. The battery organization system of claim 1, wherein the first modular insertable structure is configured to accept lengthwise a single one of the first battery; wherein the second modular insertable structure is configured to accept in parallel side-by-side the plurality of second batteries; and wherein the third modular insertable structure is configured to accept in series side-by-side a plurality of third batteries.

18. The battery organization system of claim 1, wherein the first modular insertable structure, second modular insertable structure, and third modular insertable structure are configured to attach to the first hollow structure and/or second hollow structure all together in a side-by-side arrangement.

19. The battery organization system of claim 2, further comprising a recessed cavity in an inner surface of the first hollow structure and/or the second hollow structure and wherein the recessed cavity is configured to accept the coin-style battery.

20. The battery organization system of claim 1, wherein the second modular insertable structure is configured to accept each one of the plurality of second batteries widthwise of the second modular insertable structure and further configured to accept the plurality of the second batteries in parallel side-by-side.

* * * * *